US009831728B2

(12) United States Patent
Kawashima et al.

(10) Patent No.: US 9,831,728 B2
(45) Date of Patent: Nov. 28, 2017

(54) ELECTRIC MOTOR

(75) Inventors: Yoshichika Kawashima, Kiryu (JP); Teppei Tokizaki, Kiryu (JP); Naoki Kojima, Kiryu (JP)

(73) Assignee: Mitsuba Corporation, Gunma (JP)

( * ) Notice: Subject to any disclaimer, the term of this patent is extended or adjusted under 35 U.S.C. 154(b) by 466 days.

(21) Appl. No.: 14/400,635

(22) PCT Filed: May 25, 2012

(86) PCT No.: PCT/JP2012/063475
§ 371 (c)(1),
(2), (4) Date: Nov. 12, 2014

(87) PCT Pub. No.: WO2013/175624
PCT Pub. Date: Nov. 28, 2013

(65) Prior Publication Data
US 2015/0130329 A1    May 14, 2015

(51) Int. Cl.
*H02K 23/04* (2006.01)
*H02K 23/32* (2006.01)
(Continued)

(52) U.S. Cl.
CPC ............... *H02K 1/17* (2013.01); *H02K 1/265* (2013.01); *H02K 3/28* (2013.01); *H02K 7/1166* (2013.01);
(Continued)

(58) Field of Classification Search
CPC   H02K 1/10; H02K 1/17; H02K 1/265; H02K 13/04; H02K 23/30; H02K 23/32;
(Continued)

(56) References Cited

U.S. PATENT DOCUMENTS

2007/0007838 A1*  1/2007  Kuroda .................. H02K 23/04
                                                                310/154.21
2010/0060096 A1*  3/2010  Qin ........................ H02K 23/04
                                                                310/154.11
(Continued)

FOREIGN PATENT DOCUMENTS

CN          101931299 A     12/2010
CN          202094721 U     12/2011
(Continued)

OTHER PUBLICATIONS

Motokura et al., Machine Translation of JP2005033843, Feb. 2005.*
(Continued)

*Primary Examiner* — Quyen Leung
*Assistant Examiner* — Eric Johnson
(74) *Attorney, Agent, or Firm* — Wood Herron & Evans LLP

(57) ABSTRACT

An electric motor includes a yoke having a cylindrical section, two pairs of permanent magnets disposed at an inner circumferential surface of the cylindrical section to oppose each other, and an armature rotatably supported further inside in a radial direction than the permanent magnets, wherein at least a pair of first flat sections opposing each other in the radial direction are formed at the cylindrical section, and the permanent magnets are disposed at positions distant from the first flat sections.

6 Claims, 26 Drawing Sheets

(51) Int. Cl.
    *H02K 1/26*           (2006.01)
    *H02K 3/28*           (2006.01)
    *H02K 11/02*          (2016.01)
    *H02K 1/17*           (2006.01)
    *H02K 7/116*          (2006.01)
    *H02K 13/00*          (2006.01)
    *H02K 11/25*          (2016.01)
    *H02K 5/14*           (2006.01)
    *H02K 11/026*        (2016.01)

(52) U.S. Cl.
    CPC ............ *H02K 11/25* (2016.01); *H02K 13/006* (2013.01); *H02K 23/04* (2013.01); *H02K 23/32* (2013.01); *H02K 5/148* (2013.01); *H02K 11/026* (2013.01)

(58) Field of Classification Search
    CPC ...... H02K 23/40; H02K 23/405; H02K 11/00; H02K 11/25
    USPC ...... 310/216.096–216.097, 216.069–216.073
    See application file for complete search history.

(56) References Cited

U.S. PATENT DOCUMENTS

| | | | |
|---|---|---|---|
| 2010/0231072 A1* | 9/2010 | Qin ........................ | H02K 23/04 310/83 |
| 2011/0140554 A1* | 6/2011 | Wong ...................... | H02K 1/17 310/72 |

FOREIGN PATENT DOCUMENTS

| | | | |
|---|---|---|---|
| EP | 1744538 A2 | | 1/2007 |
| JP | 04255438 A | * | 9/1992 |
| JP | 2003047184 A | | 2/2003 |
| JP | 2003311657 A | | 11/2003 |
| JP | 2005033843 A | | 2/2005 |
| JP | 2005080479 A | | 3/2005 |
| JP | 2007049884 A | | 2/2007 |
| JP | 2008048517 A | * | 2/2008 |
| JP | 2008220059 A | | 9/2008 |
| JP | 2008295152 A | * | 12/2008 |
| JP | 2009055733 A | | 3/2009 |
| JP | 2009112095 A | | 5/2009 |
| JP | 2011526777 A | | 10/2011 |
| JP | 5714871 B2 | | 5/2015 |

OTHER PUBLICATIONS

Tanaka et al., Machine Translation of JP2003047184, Feb. 2003.*
T. Thiele: "Thermal Electric Motor Protection," about.com, Apr. 11, 2012.
Chinese Patent Office, Office Action issued in Chinese Application No. 201280073320.9 dated May 18, 2016, 9 pages.
European Patent Office, Office Action issued in European Application No. 12877581.4 dated Jun. 21, 2016, 8 pages.
Japanese Patent Office, International Search Report issued in corresponding International Patent Application No. PCT/JP2012/063475 and English-language translation dated Aug. 21, 2012 (4 pages).
Chinese Patent Office, Office Action issued in Chinese Patent Application No. 201280073320.9 dated Mar. 8, 2017, 15 pages.

* cited by examiner

ELECTRIC MOTOR

FIELD OF INVENTION

The present invention relates to an electric motor mounted on, for example, a vehicle.

BACKGROUND ART

As an electric motor, for example, there is a brush-attached electric motor in which a plurality of permanent magnets are disposed at an inner circumferential surface of a bottomed cylindrical yoke, and an armature is rotatably installed further inside in a radial direction than the permanent magnets. The armature has an armature core fitted onto and fixed to a rotary shaft, and a commutator in which a plurality of segments are disposed. A plurality of teeth extending outward in the radial direction are installed at the armature core, and a plurality of slots elongated in the axial direction are formed between the teeth. A winding is inserted through these slots, and the winding is wound on the teeth through an concentrated winding method or a distributed winding method.

The winding is electrically connected to the segments of the commutator. Each of the segments is configured to come in sliding contact with a brush configured to supply electricity, and current is supplied to the winding via the brush.

When the current is supplied to the winding, a magnetic field is formed, and the armature is rotated by a magnetic attractive force or repulsive force generated between the magnetic field and the permanent magnet.

In recent years, in an electric motor having the above-mentioned configuration, further miniaturization and high performance have been required. Here, for example, an electric motor in which anisotropic rare earth element bond magnets formed of an NdFeB (neodymium-iron-boron)-based magnet powder are installed at four poles is proposed. In this way, as permanent magnets of rare earth elements having a high magnetic force are multipolarized, miniaturization and high performance of the electric motor can be attempted (for example, see Patent Literature 1).

In addition, in an electric motor in recent years, various elements have been mounted from the viewpoint of requirements of high performance, fail-safe characteristics, and so on.

For example, an electric motor including a substantially bottomed cylindrical yoke and an end bracket having a connector section and fixed to close the yoke, and in which a thermistor and a noise prevention element (corresponding to "a condenser" and "a choke coil" of the present invention) are mounted on the end bracket has been proposed (for example, see Patent Literature 2).

As in the distributed winding method, when the winding is wound between the slots disposed at predetermined intervals, the coil wound later is wound further outside in the radial direction than the coil wound first. That is, the coil wound in a post-process is disposed at an opening side in the slots. In addition, a specific slot accommodates the winding wound first and the winding wound second, and a specific slot accommodates the winding wound last and the winding wound second to last. For this reason, when all of the slots are formed in the same shape, an ineffective space is generated at each of the slots, and a position and a state of the coil become unstable. As a result, rotation imbalance of the armature may occur.

A technology is disclosed in which a rotary shaft (shaft)-side bottom surface of the slot between the coils wound first is formed substantially along an outer circumferential side line of an armature core of the coil (for example, see Patent Literature 3). Accordingly, the shaft-side end section of the coil can come in contact with the shaft-side bottom surface of each of the slots, and generation of the useless space of each of the slots can be prevented. For this reason, generation of instability of the position and state of the coil due to the space can be prevented. As a result, generation of rotation imbalance of the armature can be prevented.

CITATION LIST

Patent Literature

[Patent Literature 1] Japanese Unexamined Patent Application, First Publication No. 2005-33843
[Patent Literature 2] Japanese Unexamined Patent Application, First Publication No. 2009-112095
[Patent Literature 3] Japanese Unexamined Patent Application, First Publication No. 2008-220059

SUMMARY OF INVENTION

Technical Problem

However, since the electric motor of Patent Literature 1 has ring-shaped or tile-shaped permanent magnets disposed at an inner circumferential surface of the cylindrical yoke, a size of an appearance of the electric motor is mainly restricted by a processing thickness of the permanent magnet. Accordingly, there is a limit to performing further miniaturization while maintaining performance of the electric motor.

In addition, a process of winding the winding on the armature core and a process of connecting the connecting wire to the segments having the same electric potential should be separately performed. For this reason, a total time of a winding time of the coil on the armature and a connecting time of the connecting wire to the segment is increased, and as a result, manufacturing cost may be increased.

The end bracket of Patent Literature 2 is formed in a substantially circular shape when seen from a plan view in the axial direction, and a long plate-shaped thermistor is disposed at the outer circumferential side. The end bracket cannot be reduced in size due to interference of the thermistor. Accordingly, the yoke cannot be easily reduced in size, and thus the entire electric motor may be increased in size.

The connector section is formed to protrude from the outer circumferential wall of the end bracket. The noise prevention element is disposed between power feeding terminals disposed in the connector section. In such a configuration, there is a limit to miniaturization of the connector section and further miniaturization of the end bracket.

While the above-mentioned Patent Literature 3 is advantageous in that the rotation imbalance of the armature can be prevented, since a slot area is reduced, an increase of a space factor of the coil may become difficult.

As a result, a reduction in size and weight of the electric motor may not be easily achieved.

In consideration of the above-mentioned circumstances, an object of the present invention is to provide an electric motor capable of being miniaturized regardless of the thickness of a permanent magnet.

Another object of the present invention is to provide an electric motor in which a total time of a winding time of a coil on an armature and a connecting time of a connecting wire to a segment can be reduced, and manufacturing cost can be reduced.

Yet another object of the present invention is to provide an electric motor capable of improving a space factor of a coil while preventing generation of an ineffective space in a slot.

Solution to Problem

According to a first aspect of the present invention, an electric motor includes a yoke having a cylindrical section, two pairs of permanent magnets disposed at an inner circumferential surface of the cylindrical section to oppose each other, and an armature rotatably supported further inside in a radial direction than the permanent magnet, wherein at least a pair of first flat sections opposing each other in the radial direction are formed at the cylindrical section, and the permanent magnets are disposed at positions other than the first flat sections.

According to a second aspect of the present invention, in the electric motor according to the first aspect of the present invention, the pair of first flat sections opposing each other in the radial direction are formed at the cylindrical section.

According to a third aspect of the present invention, the electric motor according to the second aspect of the present invention includes two brushes configured to supply electricity to the armature, wherein the two brushes are disposed at mechanical angles at a 90° interval in a circumferential direction, and a heat protection element configured to cut the supply of electricity to the armature upon overheating is disposed at an opposite side of the two brushes with a rotary shaft of the armature disposed therebetween.

According to a fourth aspect of the present invention, the electric motor according to the third aspect of the present invention includes an armature core constituted by a plurality of core plates, which are stacked, each having a core main body fitted and fixed onto the rotary shaft and ten teeth protruding from the core main body outward in the radial direction, and on which a winding is wound between the two teeth neighboring the circumferential direction, wherein the teeth comprise two tooth groups, each constituted by five deformed teeth neighboring the circumferential direction, the two tooth groups are disposed to be point-symmetrical to each other about the rotary shaft, the five deformed teeth are constituted by a first deformed tooth having a distal end tilted toward an opposite side of the winding direction of the winding with respect to a virtual standard tooth extending in the radial direction, and four second deformed teeth formed in the circumferential direction at the winding direction side of the first deformed tooth and having distal ends tilted in the winding direction with respect to the virtual standard tooth, a first deformed slot formed between the second deformed teeth and the first deformed tooth adjacent to the second deformed teeth at the winding direction side, a second deformed slot formed between the first deformed tooth and the second deformed teeth adjacent to the first deformed tooth at the winding direction side, and three third deformed slots are formed between the second deformed teeth neighboring the circumferential direction, and the first deformed slot, the second deformed slot, and the third deformed slots are sequentially formed in the winding direction.

According to a fifth aspect of the present invention, the electric motor according to the fourth aspect of the present invention includes a commutator installed at the rotary shaft adjacent to the armature core, wherein the windings are wound at each of the teeth through a distributed winding method to straddle the two neighboring teeth, and a coil having a 5-phase structure is formed in the circumferential direction in sequence of a U1 phase, a V1 phase, a W1 phase, an X1 phase, a Y1 phase, a U2 phase, a V2 phase, a W2 phase, an X2 phase and a Y2 phase, the commutator has a total of the ten segments disposed in the circumferential direction such that the two segments having the same electric potential corresponding to each phase are disposed to oppose each other about the rotary shaft, and the segments having the same electric potential are constituted in four poles, ten slots and ten segments by short-circuiting the winding, the winding is connected to the two segments corresponding to the coil of the U1 phase, the winding corresponding to the U1 phase is wound between the first deformed slot and the third deformed slot disposed at a rear side in the winding direction of the first deformed slot, the winding is connected to the two segments corresponding to the coil of the V1 phase, the winding corresponding to the V1 phase is wound between the second deformed slot and the third deformed slot disposed at a rear side in the winding direction of the second deformed slot, the winding is connected to the two segments corresponding to the coil of the W1 phase, the winding corresponding to the W1 phase is wound in two third deformed slots disposed at both sides with a middle third deformed slot interposed therebetween in the three third deformed slots, the winding is connected to the two segments corresponding to the coil of the X1 phase, the winding corresponding to the X1 phase is wound between the first deformed slot and the third deformed slot disposed at a rear side in the winding direction of the first deformed slot, the winding is connected to the two segments corresponding to the coil of the Y1 phase, and then the winding corresponding to the Y1 phase is wound between the second deformed slot and the third deformed slot disposed at a rear side in the winding direction of the second deformed slot, further, simultaneously with the formation of the coils of the U1 phase, the V1 phase, the W1 phase, the X1 phase and the Y1 phase, the winding is connected to the two segments corresponding to the coil of the U2 phase, the winding corresponding to the U2 phase is wound between the first deformed slot and the third deformed slot disposed at a rear side in the winding direction of the first deformed slot, the winding is connected to the two segments corresponding to the coil of the V2 phase, the winding corresponding to the V2 phase is wound between the second deformed slot and the third deformed slot disposed at a rear side in the winding direction of the second deformed slot, the winding is connected to the two segments corresponding to the coil of the W2 phase, the winding corresponding to the W2 phase is wound between the two third deformed slots disposed at both sides with the middle third deformed slot interposed therebetween in the three third deformed slots, the winding is connected to the two segments corresponding to the coil of the X2 phase, the winding corresponding to the X2 phase is wound between the first deformed slot and the third deformed slot disposed at a rear side in the winding direction of the first deformed slot, the winding is connected to the two segments corresponding to the coil of the Y2 phase, and then the winding corresponding to the Y2 phase is wound between the second deformed slot and the third deformed slot disposed at a rear side in the winding direction of the second deformed slot, and further, a positional relationship between the predetermined segments and the predetermined teeth on which the winding wound around is an opposite positional relationship about the rotary shaft.

Advantageous Effects of Invention

According to the above-mentioned electric motor, since the first flat section is formed at the cylindrical section of the yoke, the electric motor can be reduced in size in comparison with the case in which the cylindrical section is formed in a cylindrical shape. In addition, as the permanent magnets are disposed at positions distant from the first flat section, the electric motor can be reduced in size regardless of the thickness of the permanent magnet.

According to the above-mentioned electric motor, the teeth can be tilted in response to the position of the coil wound in each of the deformed slots, and generation of an ineffective space in the deformed slot can be suppressed. For this reason, a space factor of the coil can be improved, and the coil can be distributed in the deformed slots with good balance. As a result, the electric motor can be reduced in size and weight.

In addition, since the armature core is formed in the deformed shape and in a point-symmetrical shape about the rotary shaft, occurrence of the rotation imbalance of the armature can be more securely prevented.

According to the above-mentioned electric motor, as the winding method of the winding on the armature core, a so-called double flyer method of winding the winding simultaneously at two places with a relationship in which the distributed winding is point-symmetrical about the rotary shaft can be employed. For this reason, a total time of a winding time of the coil on the armature and a connecting time of the connecting wire to the segments can be further reduced, and manufacturing cost can be further reduced.

In addition, since a positional relationship between the predetermined segments and the predetermined teeth through which the winding crosses is an opposite positional relationship about the rotary shaft, the winding under the commutator can be routed to be hooked by the rotary shaft. For this reason, it is possible to prevent the winding under the commutator from being loosened outward in the radial direction, and it is possible to reduce thickening due to the winding.

DESCRIPTION OF EMBODIMENTS

First Embodiment

Hereinafter, an electric motor 2 of a first embodiment and a speed-reduction-mechanism-attached motor apparatus 1 (corresponding to "a driving apparatus" of the Claims) using the electric motor 2 will be described with reference to FIGS. 1 and 2.

Figure 1:
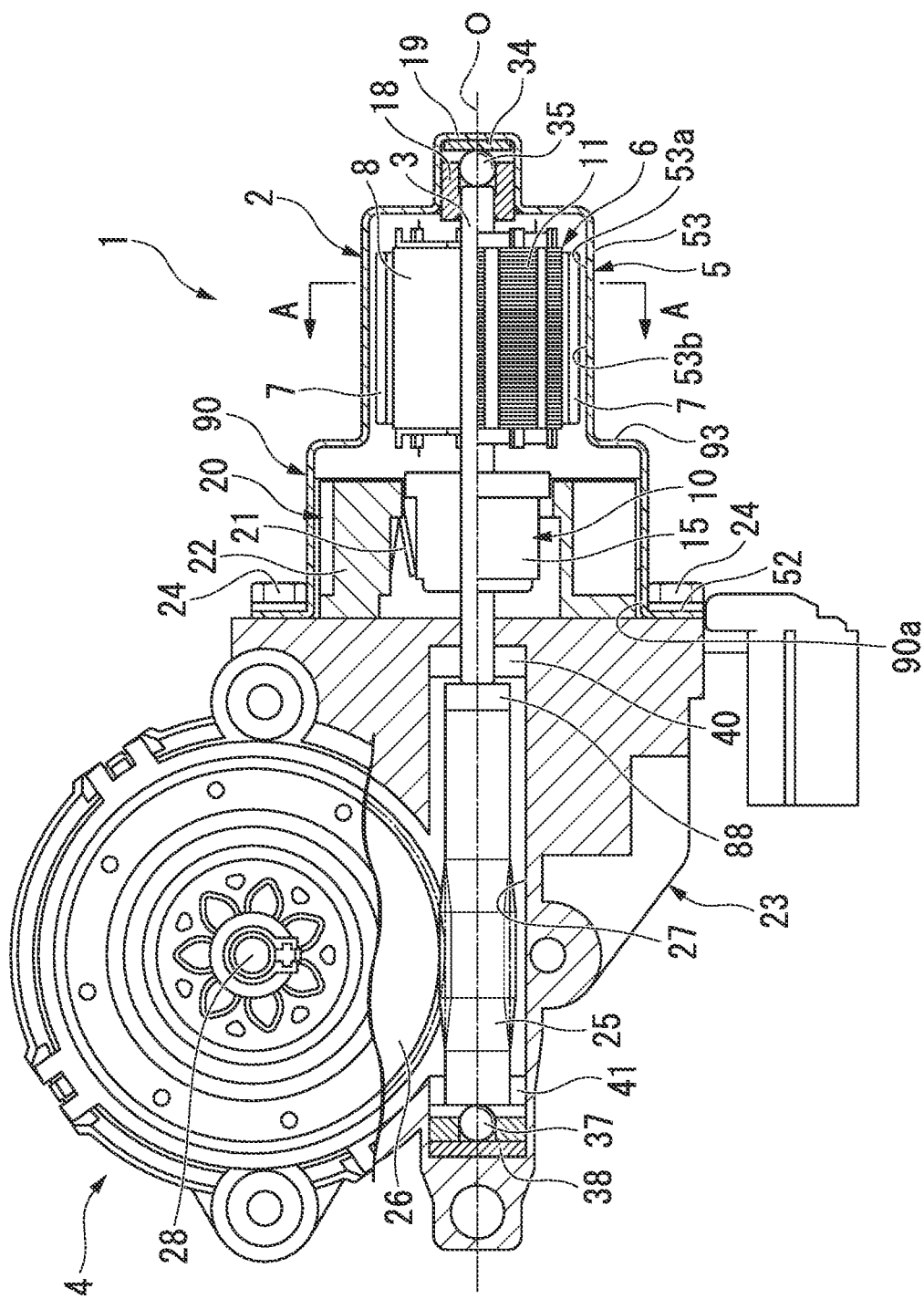
FIG. 1 is a partial cross-sectional view of a speed-reduction-mechanism-attached motor apparatus according to a first embodiment.
Figure 2:
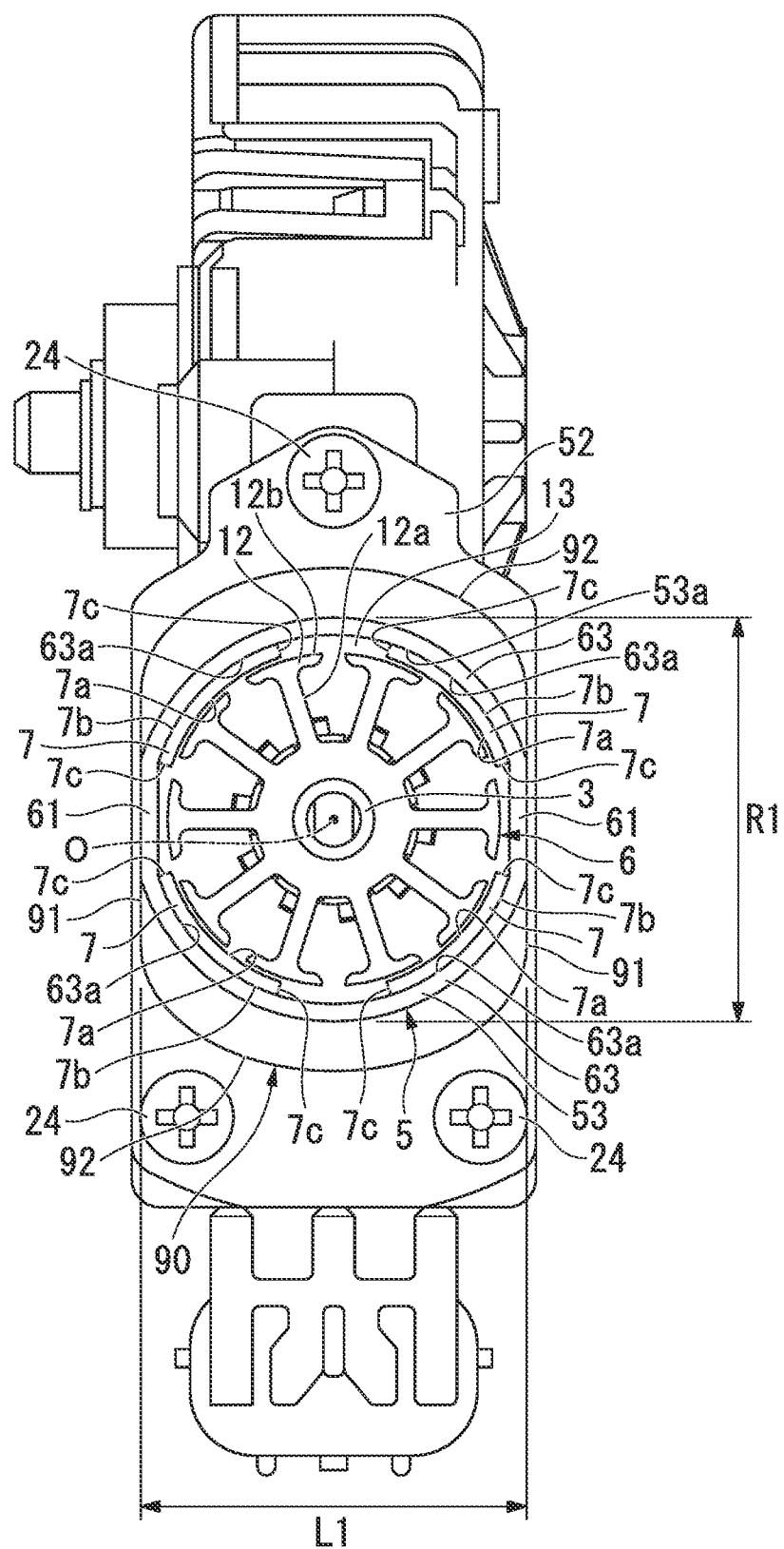
FIG. 2 is a cross-sectional view taken along line A-A of FIG. 1.

The speed-reduction-mechanism-attached motor apparatus 1 using the electric motor 2 shown in FIGS. 1 and 2 is used to drive at least one of, for example, a power window, a sunroof, an electric seat and a wiper apparatus of a vehicle.

(Electric Motor)

In the electric motor 2, an armature 6 is rotatably installed in a cylindrical section 53 of a yoke 5, and a brush holder 22 is fitted and fixed into a brush holder-receiving section 90 formed at an opening section 53b side of the cylindrical section 53.

The yoke 5 is a bottomed cylindrical member formed of a metal such as iron or the like, and is formed through pressing by, for example, deep drawing or the like.

The cylindrical section 53 occupying most of the yoke 5 is constituted by a pair of first flat sections 61 opposing each other in the radial direction with a central axis O sandwiched therebetween when seen in the axial direction, and an arc-shaped section 63 configured to connect the pair of first flat sections 61.

A clearance of the first flat section 61 is set to be slightly larger than a diameter of the armature 6 disposed in the cylindrical section 53.

The arc-shaped section 63 is connected to an end in a circumferential direction of each of the opposite first flat sections 61. A center of curvature of the arc-shaped section 63 is set to be the same as a rotation center of the armature 6 when seen in the axial direction. In addition, a radius of curvature of an inner circumferential surface 63a of the arc-shaped section 63 is set to be slightly larger than a radius of the armature 6.

Permanent magnets 7 are installed at an inner circumferential surface 53a of the cylindrical section 53 of the yoke 5. A rare earth element magnet such as a neodymium sintering magnet or a neodymium bond magnet, a ferrite magnet, or the like is used in the permanent magnet 7. The permanent magnet 7 is formed in substantially an arc shape when seen in the axial direction, and has an inner circumferential surface 7a and an outer circumferential surface 7b parallel to each other, and a side surface 7c disposed therebetween.

A radius of curvature of the inner circumferential surface 7a of the permanent magnet 7 is set to be slightly larger than a radius of the armature 6. In addition, a radius of curvature of the outer circumferential surface 7b of the permanent magnet 7 is set to be substantially equal to a radius of curvature of the inner circumferential surface 63a of the arc-shaped section 63 formed at the cylindrical section 53. Further, a length in the axial direction of the permanent magnet 7 is set to be substantially equal to a length in the axial direction of the cylindrical section 53 of the yoke 5.

In the permanent magnets 7 formed as described above, the outer circumferential surfaces 7b of the four permanent magnets 7 are directed toward the arc-shaped section 63 of the cylindrical section 53 and fixed to the inner circumferential surface 63a of the arc-shaped section 63. Further, the permanent magnet 7 is attached to the inner circumferential surface 63a of the arc-shaped section 63 by an adhesive or the like.

The four permanent magnets 7 are disposed such that magnetic N poles and S poles are alternately disposed in the circumferential direction. Then, the four permanent magnets 7 are disposed such that the magnetic N poles and S poles are opposing each other. In addition, a pitch angle of the neighboring permanent magnets 7 is set to about 90°. That is, the electric motor 2 constitutes a motor having a bipolar pair.

Here, when a width of the opposite first flat sections 61 is represented as L1 and a width of the opposite arc-shaped sections 63 is represented as R1, the width L1 of the first flat sections 61 and the width R1 of the arc-shaped sections 63 are set to satisfy:

$$L1 < R1 \quad (1)$$

Then, as shown in FIG. 2, the pair of first flat sections 61 of the cylindrical section 53 are installed to be flush with a pair of flat walls 91 formed at the brush holder-receiving section 90 (to be described below). In addition, the first flat sections 61 of the cylindrical section 53 are disposed in a lateral direction (a leftward/rightward direction of FIG. 2) of the brush holder 22 (to be described below).

A boss 19 protruding outward along the central axis O is formed at substantially a center of a bottom wall 51 of the yoke 5. A bearing 18 formed of an annular metal or the like is press-fitted and fixed to an inner circumferential surface of the boss 19. One end side (a right side of FIG. 1) of a rotary shaft 3 is axially supported by the boss 19 of the yoke 5 via the bearing 18.

In addition, a thrust plate 34 is installed at a bottom section of the boss 19. The thrust plate 34 receives a thrust load of the rotary shaft 3 via a steel ball 35. The steel ball 35 absorbs core deviation of the rotary shaft 3 while reducing sliding resistance between the rotary shaft 3 and the thrust plate 34.

The brush holder-receiving section 90 is integrally formed with the cylindrical section 53 of the yoke 5 at the opening section 53b side (a left side of FIG. 1). A circumferential wall 90a of the brush holder-receiving section 90 is configured to receive the brush holder 22 (to be described below). The circumferential wall 90a of the brush-holder receiving section 90 is formed in a substantially oval shape when seen in the axial direction, one direction of the radial direction (the upward/downward direction of FIG. 2) is a longitudinal direction, and the other direction of the radial direction (the leftward/rightward direction of FIG. 2) is a lateral direction.

The brush holder-receiving section 90 has the pair of flat walls 91 opposite to each other in the lateral direction, and a pair of arc-shaped walls 92 connecting end sections in the circumferential direction of the flat wall 91 in the longitudinal direction.

Meanwhile, a stepped wall 93 is formed between the arc-shaped wall 92 of the brush holder-receiving section 90 and the arc-shaped section 63 of the cylindrical section 53. The arc-shaped section 63 of the cylindrical section 53 and the arc-shaped wall 92 of the brush holder-receiving section 90 are continuously and integrally formed with each other due to the stepped wall 93. Further, the pair of flat walls 91 are formed to be flush with the pair of first flat sections 61 formed at the cylindrical section 53.

As described above, the width L1 of the first flat section 61 and the width R1 of the arc-shaped section 63 satisfy Formula (1). Accordingly, in the pair of first flat sections 61 and the pair of arc-shaped sections 63 of the cylindrical section 53, the pair of first flat sections 61 having the smaller width L1 are disposed in the lateral direction of the brush holder 22.

An outer flange section 52 configured to fasten and fix the electric motor 2 to a worm gear speed reduction mechanism 4 is formed at the circumferential wall 90a of the brush holder-receiving section 90 side.

The outer flange section 52 is formed in a substantially pentagonal shape when seen from a plan view in the axial direction to be elongated in the longitudinal direction of the brush holder-receiving section 90, and a portion that becomes a peak is formed to be positioned in the longitudinal direction. In addition, a width in the lateral direction of the outer flange section 52 is set to be slightly larger than that of the pair of flat walls 91 formed at the brush holder-receiving section 90.

In addition, one bolt hole (not shown) is formed at one end side (an upper side of FIG. 2) in the longitudinal direction of the outer flange section 52 that becomes a peak, and bolt holes (not shown) are formed at the other end side (a lower side of FIG. 2) at each corner section. Bolts 24 are inserted through each of the bolt holes.

(Armature)

The armature 6 rotatably installed in the cylindrical section 53 of the yoke 5 includes an armature core 8 fitted and fixed onto the rotary shaft 3, an armature coil (not shown) wound on the armature core 8, and a commutator 10 disposed at the other end side of the rotary shaft 3. The armature core 8 is formed by stacking a plurality of ring-shaped plate members 11 formed of an electromagnetic steel sheet or the like in the axial direction.

As shown in FIG. 2, ten teeth 12 formed in substantially a T shape when seen in the axial direction are radially disposed at an outer circumferential section of a plate member 11 in the circumferential direction at equal intervals. Each of the teeth 12 is constituted by a winding trunk section 12a extending in the radial direction, and an outer circumferential section 12b formed at a distal end of the winding trunk section 12a and overhanging in the circumferential direction.

A groove-shaped slot 13 extending in the axial direction is formed at an outer circumference of the armature core 8. The slot 13 is formed by fitting and fixing the plurality of plate members 11 onto the rotary shaft 3, and is formed between the outer circumferential sections 12b of the neighboring teeth 12. Since the number of teeth is ten as described above, the number of slots 13 between the teeth 12 is also ten.

In addition, since the teeth 12 are disposed in the circumferential direction at equal intervals, the plurality of slots 13 are also formed in the circumferential direction at equal intervals.

An insulator (not shown) formed of an insulating material such as a resin or the like is installed between the slots 13. Then, a winding (not shown) is wound on the winding trunk sections 12a of the teeth 12 via the insulator. Accordingly, a plurality of armature coils (not shown) are formed at an outer circumference of the armature core 8.

Ten segments 15 formed of a conductive material are attached to an outer circumferential surface of the commutator 10 fitted and fixed onto the other end side (the left side of FIG. 1) of the rotary shaft 3.

The segments 15 are formed by plate-shaped metal pieces elongated in the axial direction. Then, the segments 15 are fixed to each other in parallel in the circumferential direction at equal intervals while being spaced apart and insulated from each other. Accordingly, the electric motor 2 is a direct current motor constituted by four poles, ten slots and ten segments in which the number of permanent magnets 7 is four, the number of slots 13 is ten, and the number of segments 15 is ten.

A riser (not shown) curved to return to the outer diameter side is integrally formed with an end section of each of the segments 15 near the armature core 8. The winding of the armature coil is hooked by the riser, and the winding is fixed to the riser by, for example, fusing. Accordingly, the segment 15 and the armature coil corresponding to the segment are electrically connected.

A brush (not shown) configured to supply power to the segment 15 is in sliding contact with the segment 15. The brush is installed at the brush holder 22 received in the circumferential wall 90a of the brush holder-receiving section 90. More specifically, the brush is protrudably installed in the brush holder 22 while being biased via a spring 21. The distal end sections of the brushes are biased by the spring 21 and thus come in sliding contact with the commutator 10. Then, a brush holder unit 20 is constituted by the brush holder 22, the brush, the spring 21, or the like.

The brush holder 22 in which the brush is received is formed to be substantially equal to an inner circumferential shape of the brush holder-receiving section 90 when seen in the axial direction. That is, the brush holder 22 is formed in a substantially oval shape like the brush holder-receiving section 90, and has a pair of flat walls (not shown) opposing each other in the lateral direction (the leftward/rightward direction of FIG. 2), and a pair of arc-shaped walls (not shown) connecting end sections in the circumferential direction of the flat wall in the longitudinal direction (the upward/downward direction of FIG. 2). Then, the pair of first flat sections 61 formed at the yoke 5 and the pair of flat walls 91 formed at the brush holder-receiving section 90 are disposed in the lateral direction of the brush holder 22.

The electric motor 2 formed as described above is fixed by inserting the bolt 24 into a bolt hole formed in the outer flange section 52 of the yoke 5 and threadedly engaging the bolt 24 with the worm gear speed reduction mechanism 4.

A gear housing 23 configured to receive a worm shaft 25 and a worm wheel 26 is installed at the worm gear speed reduction mechanism 4.

The worm shaft 25 is accommodated in a worm shaft accommodating section 27 formed at the gear housing 23. The worm shaft 25 is connected to the other end side (the left side of FIG. 1) of the rotary shaft 3 of the electric motor 2 via a joint member 88 such as a coupling or the like.

The worm shaft 25 is installed concentrically with the rotary shaft 3. In addition, both side ends of the worm shaft 25 are rotatably supported by bearings 40 and 41 installed at the worm shaft accommodating section 27. Further, like in the rotary shaft 3, a thrust plate 38 and a steel ball 37 are installed at the other end side (the left side of FIG. 1) of the worm shaft 25 to receive the thrust load of the worm shaft 25.

An output shaft 28 is installed at the worm wheel 26 meshed with the worm shaft 25. The output shaft 28 is connected to be rotated with the worm wheel 26 and installed in a direction perpendicular to the rotary shaft 3 of the electric motor 2. Then, as the output shaft 28 is rotated, an electric component such as a power window, a sunroof, an electric seat, a wiper apparatus, or the like, of the vehicle is operated.

(Effects)

According to the first embodiment, as the first flat section 61 is formed at the cylindrical section 53 of the yoke 5, the electric motor 2 can be reduced in size in comparison with the case in which the cylindrical section 53 is formed in a cylindrical shape. In addition, as the permanent magnet 7 is disposed at a position distant from the first flat section 61, the electric motor 2 can be reduced in size regardless of the thickness of the permanent magnet 7.

In addition, according to the first embodiment, since the brush holder-receiving section 90 capable of receiving the brush holder 22 is integrally formed with the opening section 53b of the cylindrical section 53, the brush holder-receiving section 90 can be formed at a low cost.

In addition, according to the first embodiment, the first flat section 61 of the yoke 5 is formed to be flush with the flat wall 91 disposed in the lateral direction of the brush holder-receiving section 90. Further, the width L1 of the first flat section 61 and the width R1 of the arc-shaped section 63 are formed to satisfy Formula (I). Accordingly, as the pair of first flat sections 61 having the smaller width L1 are disposed in the lateral direction of the brush holder 22, even when the brush holder-receiving section 90 is installed, the entire electric motor 2 can be miniaturized and flattened.

Further, according to the first embodiment, since the above-mentioned small electric motor 2 is employed as a driving source of the speed-reduction-mechanism-attached motor apparatus 1, the speed-reduction-mechanism-attached motor apparatus 1 can be reduced in size.

(Modified Example of First Embodiment)

Next, a modified example of the first embodiment will be described with reference to FIGS. 3 and 4. The pair of first flat sections 61 are formed at the yoke 5 of the electric motor 2 of the first embodiment. However, the electric motor 2 of the modified example is distinguished from the electric motor 2 of the first embodiment in that two pairs of first flat sections 61 are formed at the yoke 5 and two pairs of arc-shaped sections 63 are formed to straddle the neighboring first flat section 61. Further, detailed description of the same components as the first embodiment will be omitted.

Figure 3:
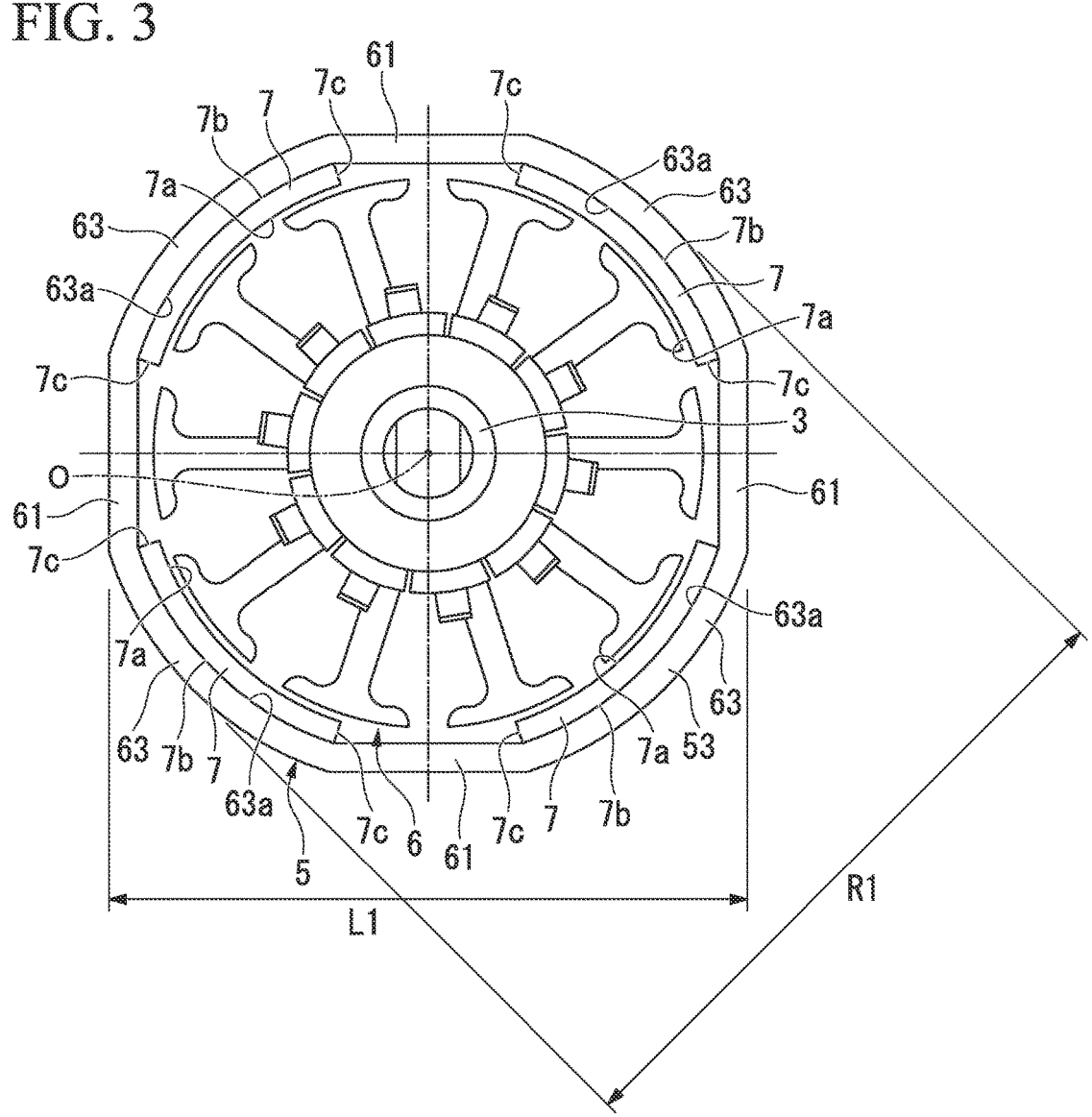
FIG. 3 is a lateral cross-sectional view of an electric motor according to a modified example of the first embodiment.
Figure 4:
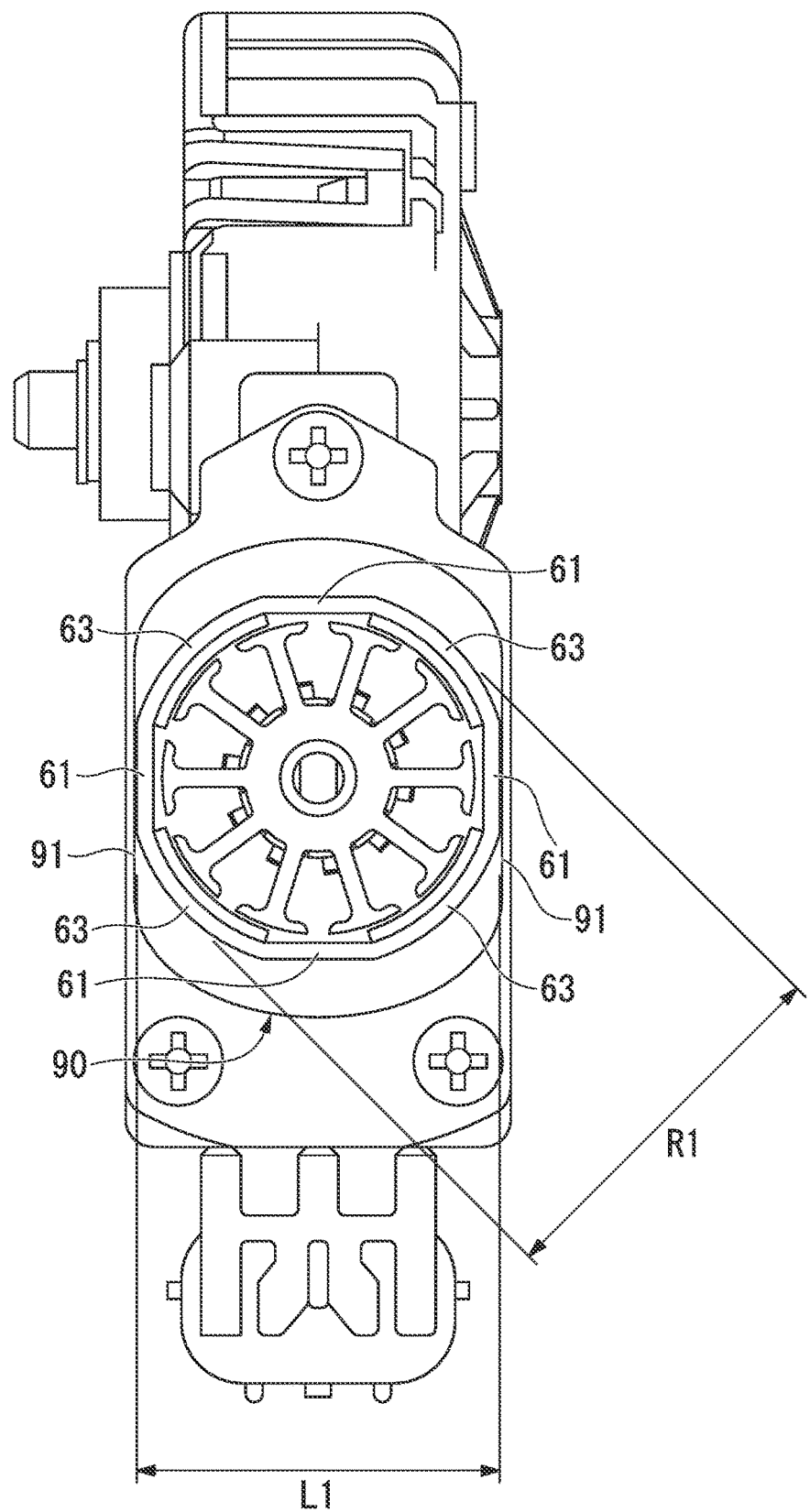
FIG. 4 is a view describing a speed-reduction-mechanism-attached motor apparatus according to the modified example of the first embodiment.

As shown in FIGS. 3 and 4, like in the first embodiment, one pair of first flat sections 61 among the two pairs of first flat sections 61 are formed in the lateral direction (the leftward/rightward direction of FIG. 3) of the brush holder 22 (see FIG. 1). Further, in the yoke 5 of the modified example, the other pair of first flat sections 61 among the two pairs of first flat sections 61 are formed in the longitudinal direction (the upward/downward direction of FIG. 3) of the brush holder. That is, the four first flat sections 61 are formed at the yoke 5 at 90° pitches. In addition, the arc-shaped section 63 are similarly formed at the four first flat sections 61 at 90° pitches, and connect end sections in the circumferential direction of the neighboring first flat sections 61. Then, the four permanent magnets 7 are fixed to inner circumferential surfaces of the arc-shaped sections 63.

Here, in the modified example, like in the first embodiment, when a width of the two pairs of opposite first flat sections 61 is represented as L1 and a width of the two pairs of opposite arc-shaped sections 63 is represented as R1, the width L1 of the first flat sections 61 and the width R1 of the arc-shaped sections 63 are set to satisfy:

$$L1<R1 \quad (1)$$

Then, as shown in FIG. 4, in the two pairs of first flat sections 61 formed at the cylindrical section 53, the one pair of first flat sections 61 are formed to be flush with the pair of flat walls 91 formed at the brush holder-receiving section 90. In addition, the pair of first flat sections 61 and the flat walls 91 of the brush holder-receiving section 90 are disposed in the lateral direction (the leftward/rightward direction of FIG. 4) of the brush holder (not shown). In addition, the arc-shaped sections 63 are disposed at a portion other than the lateral direction of the brush holder. That is, in the two pairs of first flat sections 61 and the two pairs of arc-shaped sections 63 of the cylindrical section 53, the pair of first flat sections 61 having the smaller width L1 are disposed in the lateral direction of the brush holder.

(Effects of Modified Example of First Embodiment)

According to the modified example of the first embodiment, as the two pairs of first flat sections 61 having the smaller width than that of the arc-shaped sections 63 are formed, the cylindrical section 53 of the electric motor 2 can be reduced in size in the longitudinal direction in addition to the lateral direction of the brush holder. Accordingly, in addition to the effects of the first embodiment, it is possible to provide the small electric motor 2 having good layout performance and the small speed-reduction-mechanism-attached motor apparatus 1 using the electric motor 2.

Second Embodiment (Yoke of Octagonal Cross-Section)

Next, a second embodiment will be described with reference to FIGS. 5 and 6. In the first embodiment, the cylindrical section 53 is formed to have a substantially oval cross-section due to the pair of first flat sections 61 and the pair of arc-shaped sections 63. In addition, in the modified example of the first embodiment, the cylindrical section 53 is formed to have a substantially oval cross-section due to the two pairs of first flat sections 61 and the two pairs of arc-shaped sections 63.

However, the second embodiment is distinguished from the electric motor 2 of the first embodiment in that the cylindrical section 53 is formed in an octagonal cross-section. Further, detailed description of the same components as the first embodiment and the modified example of the first embodiment will be omitted.

Figure 5:
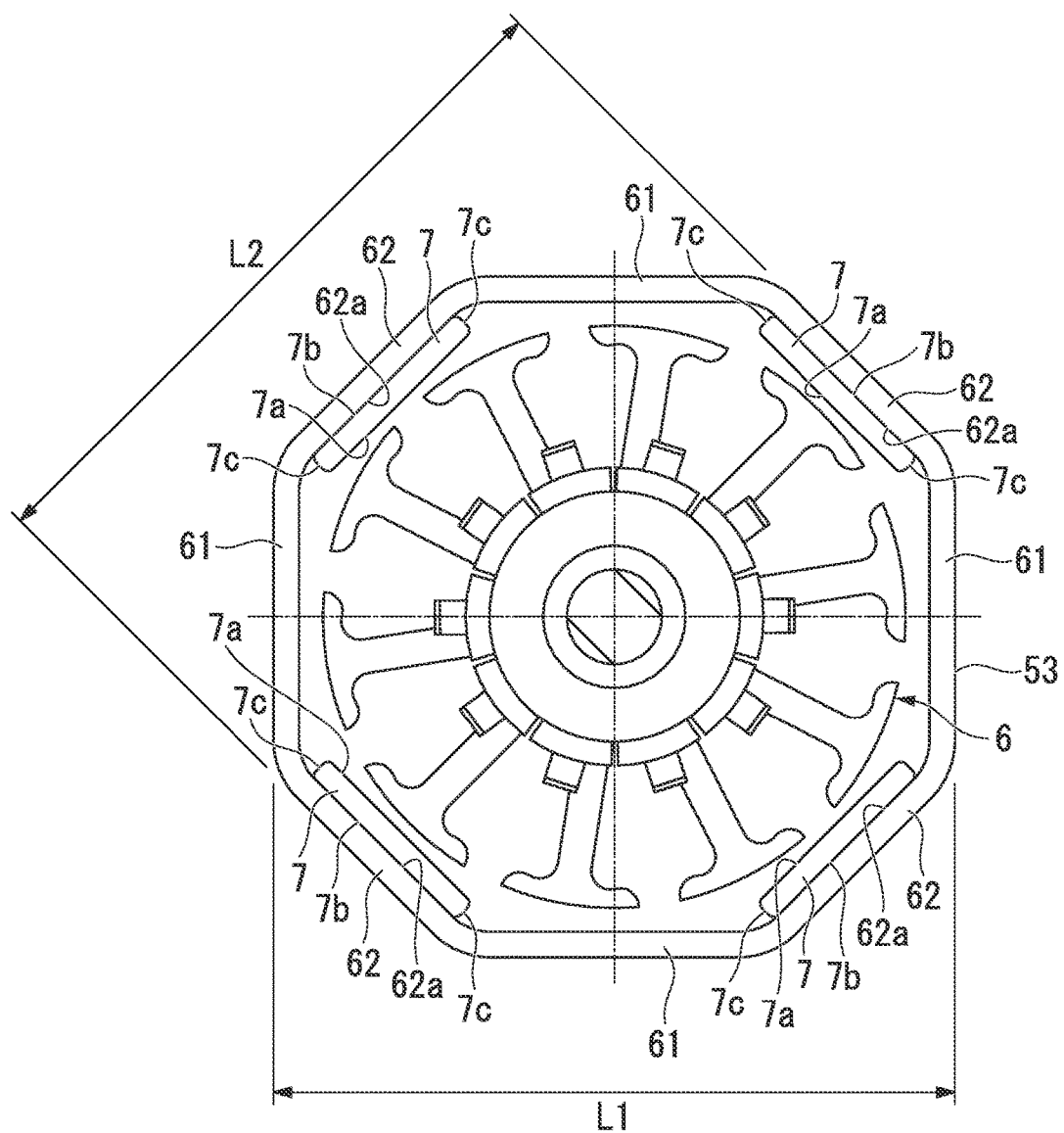
FIG. 5 is a lateral cross-sectional view of an electric motor according to a second embodiment.
Figure 6:
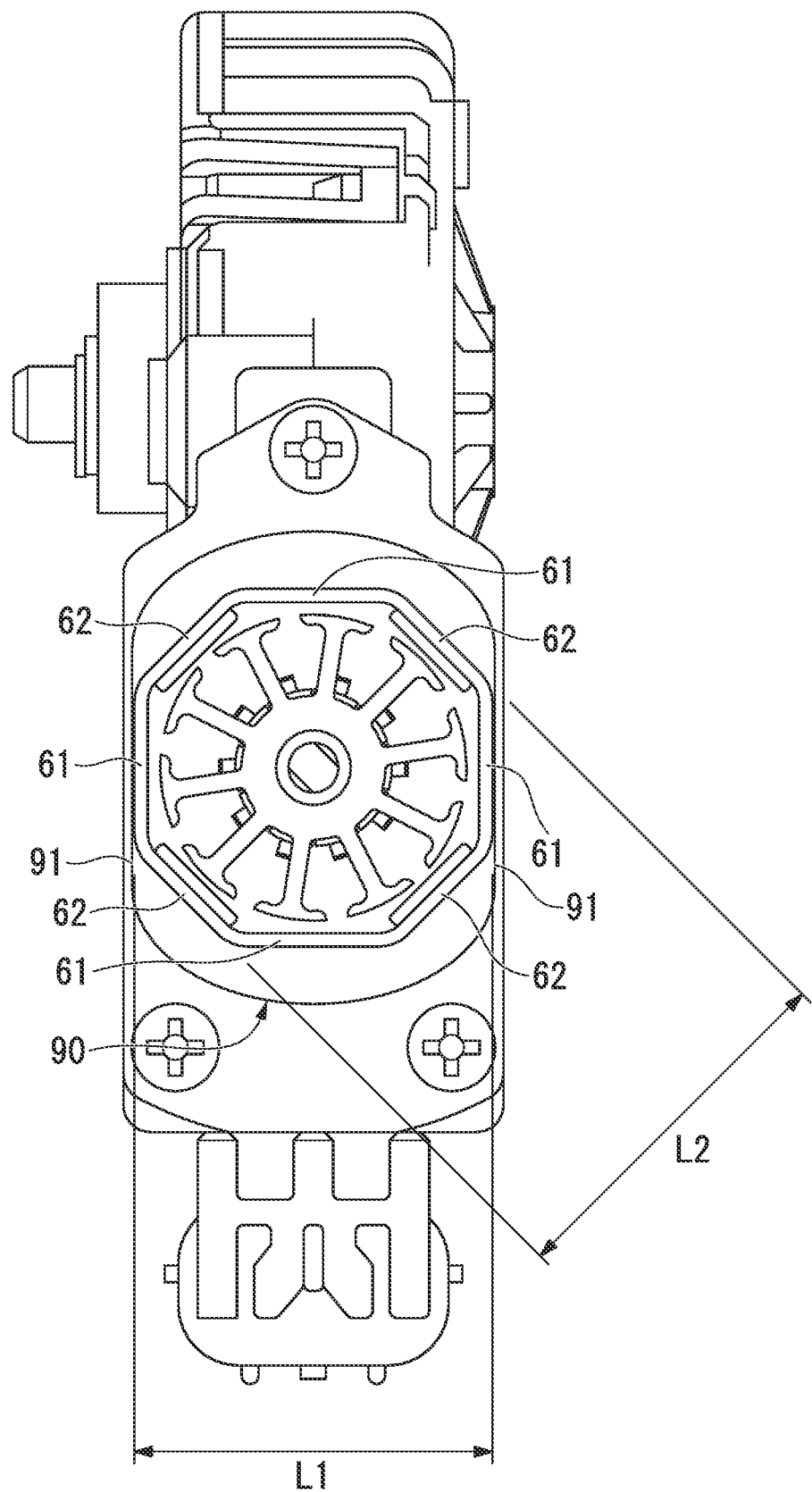
FIG. 6 is a view describing a speed-reduction-mechanism-attached motor apparatus according to the second embodiment.

As shown in FIGS. 5 and 6, the cylindrical section 53 of the embodiment is formed in an octagonal cross-section, and formed by the two pairs of first flat sections 61 and two pairs of second flat sections 62 linearly connecting end sections in the circumferential direction of the neighboring first flat sections 61. Then, the permanent magnet 7 formed in the flat plate shape is installed at an inner surface 62a of the second flat section 62.

A clearance of the first flat sections 61 in the radial direction of the cylindrical section 53 is set to be slightly larger than the diameter of the armature 6. In addition, a clearance of the second flat sections 62 in the radial direction of the cylindrical section 53 is set to be slightly larger than a dimension obtained by adding the width of the two permanent magnets 7 to the diameter of the armature 6.

Further, when a width of the opposite first flat sections 61 is represented as L1 and a width of the opposite second flat sections 62 is represented as L2, the width L1 of the first flat section 61 and the width L2 of the second flat section 62 are set to satisfy:

$$L1<L2 \quad (2)$$

Then, as shown in FIG. 6, the pair of first flat sections 61 of the cylindrical section 53 are formed to be flush with the pair of flat walls 91 formed at the brush holder-receiving section 90. In addition, the first flat sections 61 of the cylindrical section 53 and the flat walls 91 of the brush holder-receiving section 90 are disposed in the lateral direction (the leftward/rightward direction of FIG. 6) of the brush holder (not shown). That is, in the pair of first flat sections 61 and the pair of second flat sections 62 formed at the cylindrical section 53, the pair of first flat sections 61 having the smaller width L1 are disposed in the lateral direction of the brush holder.

(Effects of Second Embodiment)

According to the embodiment, as the cylindrical section 53 is formed in an octagonal cross-section, even when the arc-shaped section 63 (see FIG. 2) is formed at the cylindrical section 53 like in the first embodiment, the electric motor 2 can be further reduced in size.

In addition, since the permanent magnet 7 is fixed to the inner surface 62a of the second flat section 62, the permanent magnet 7 can be formed in a flat plate shape. Accordingly, in comparison with the case in which the permanent magnet 7 is formed in substantially an arc shape, processing cost can be reduced. In particular, it is effective to use a rare earth element magnet such as a neodymium sintering magnet or a neodymium bond magnet in which a curved surface is not easily be formed.

Further, since the permanent magnet 7 having the flat plate shape is fixed to the flat surface formed at the inner surface 62a of the second flat section 62, in particular, when the permanent magnet 7 is fixed using the adhesive agent, the permanent magnet 7 can be securely fixed.

Further, in the first embodiment and the second embodiment, the case in which the worm gear speed reduction mechanism 4 is connected to the electric motor 2 has been described. However, connection of the electric motor 2 is not limited to the worm gear speed reduction mechanism 4, and the electric motor 2 may be connected to an actuator mechanism in addition to the worm gear speed reduction mechanism 4, or another external instrument.

In the first embodiment and the second embodiment, the case in which the speed-reduction-mechanism-attached motor apparatus 1 (the driving apparatus) is used to drive at least one of, for example, a power window, a sunroof, an electric seat and a wiper apparatus of the vehicle has been described. However, use of the speed-reduction-mechanism-attached motor apparatus 1 is not limited thereto, and may be applied to various apparatuses such as electric power steering of the vehicle, electric components other than the vehicle, or the like.

(Modified Example of Second Embodiment)

Figure 7:
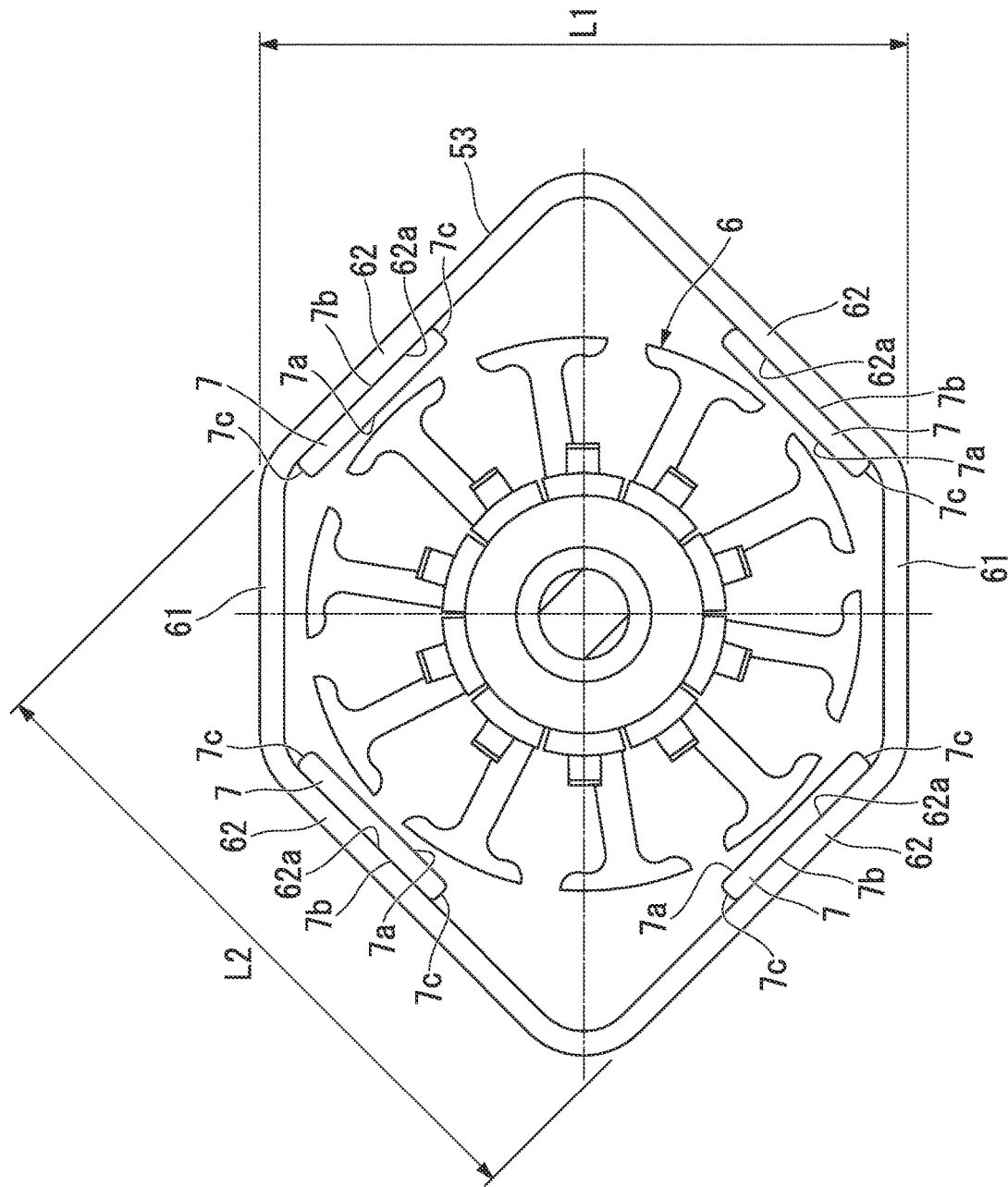
FIG. 7 is a lateral cross-sectional view of an electric motor according to a modified example of the second embodiment.

In addition, in the second embodiment, the case in which the cylindrical section 53 is formed in an octagonal cross-section, and constituted by the two pairs of first flat sections 61 and the two pairs of second flat sections 62 linearly connecting the end sections in the circumferential direction of the neighboring first flat sections 61 has been described. However, as shown in FIGS. 7 and 8, the cylindrical section 53 may be formed in a hexagonal cross-section.

That is, the cylindrical section 53 according to the modified example of the second embodiment is formed by the pair of first flat sections 61 and the two pairs of second flat sections 62 linearly connecting the end sections in the circumferential direction of the neighboring first flat sections 61. Then, the permanent magnet 7 formed in a flat plate shape is fixed to the inner surface 62a of the second flat section 62.

Figure 8:
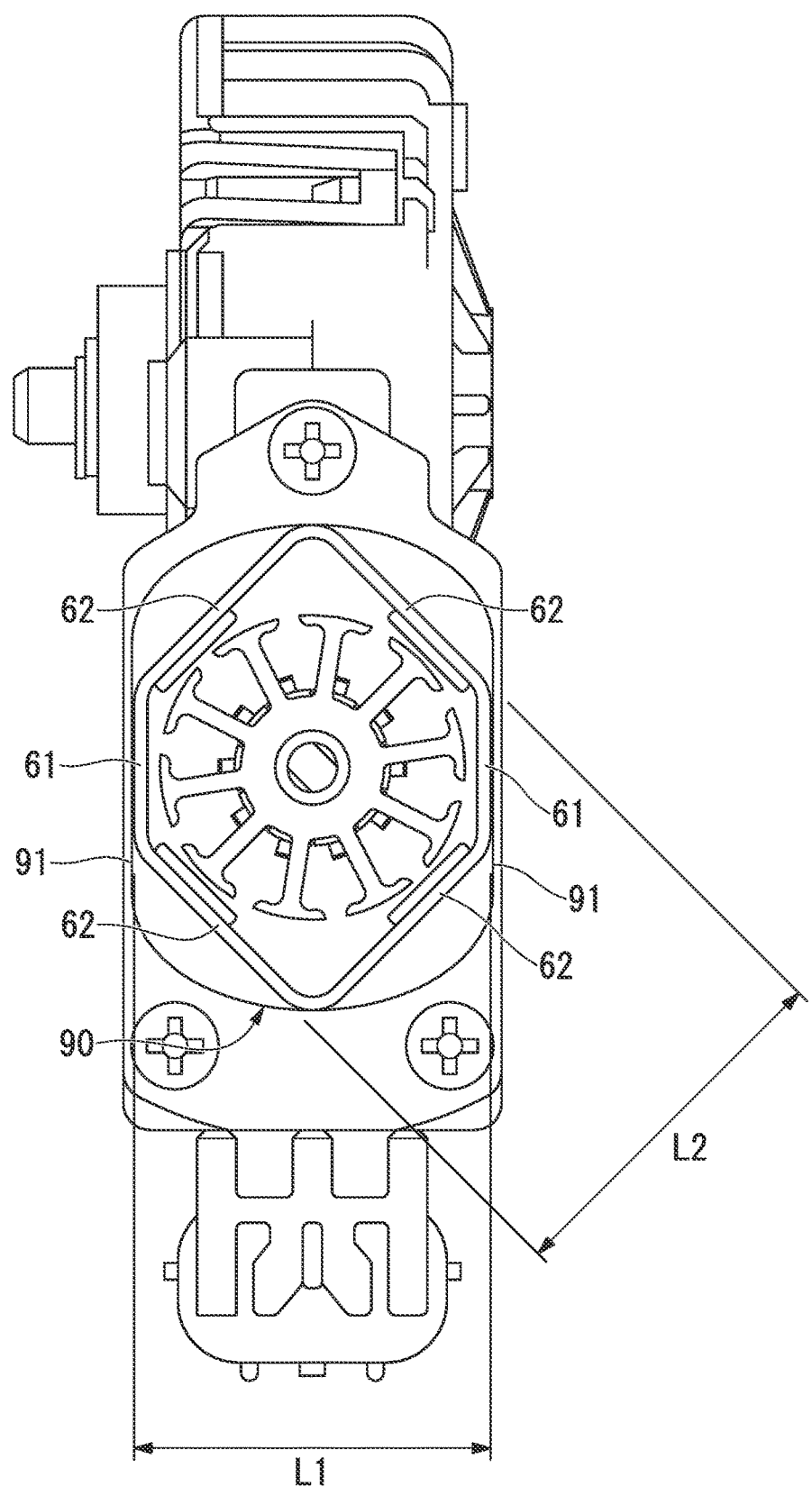
FIG. 8 is a lateral cross-sectional view of a speed-reduction-mechanism-attached motor according to a modified example of the second embodiment.

In addition, the yoke 5 is disposed such that the first flat section 61 is flush with the flat wall 91 disposed in the lateral direction of the brush holder-receiving section 90 (see FIG. 8). As the yoke 5 is disposed in this way, even when the cylindrical section 53 is formed in a substantially hexagonal cross-section, the electric motor 2 can be flattened.

Third Embodiment

Hereinafter, an electric motor 102 of a third embodiment and a speed-reduction-mechanism-attached motor apparatus 101 using the electric motor 102 will be described with reference to FIGS. 9 and 10.

Figure 9:
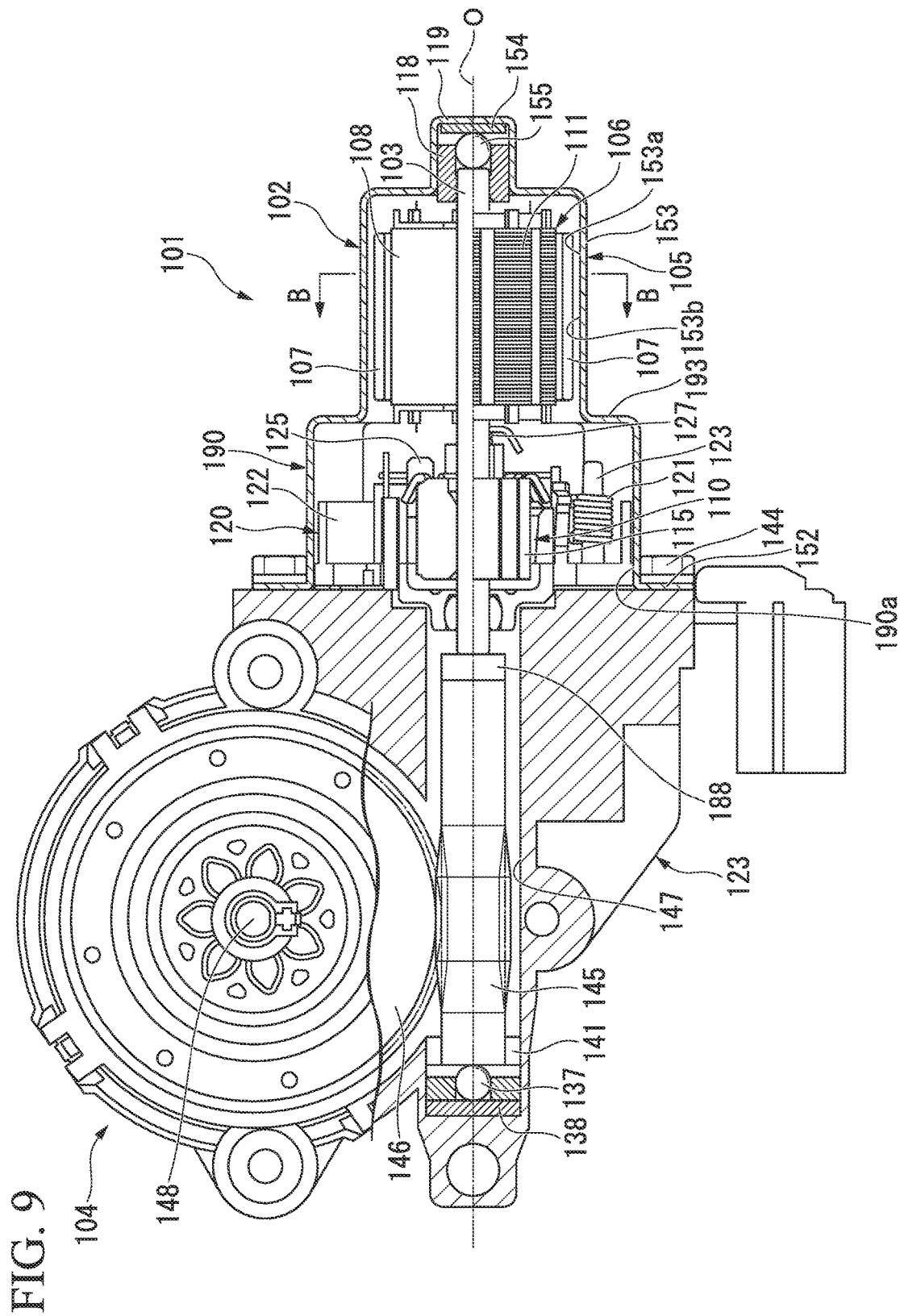
FIG. 9 is a partial cross-sectional view of a speed-reduction-mechanism-attached motor apparatus according to a third embodiment.
Figure 10:
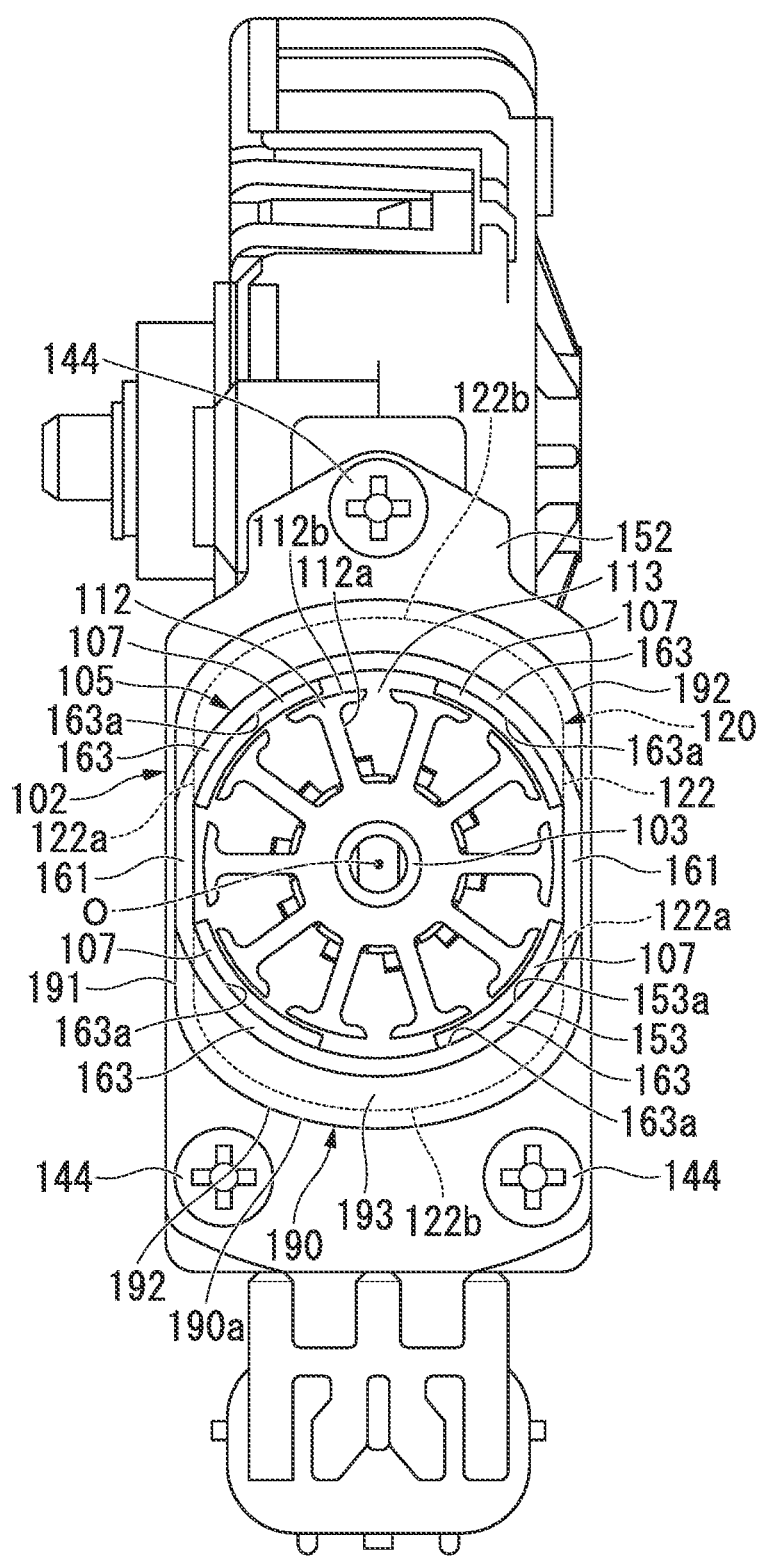
FIG. 10 is a cross-sectional view taken along line B-B of FIG. 9.

The speed-reduction-mechanism-attached motor apparatus 101 using the electric motor 102 shown in FIGS. 9 and 10 is used to drive at least one of, for example, a power window, a sunroof, an electric seat, and a wiper apparatus of the vehicle.

In the electric motor 102, an armature 106 is rotatably installed in a cylindrical section 153 of a yoke 105, and a brush holder unit 120 (see FIG. 11) configured to receive a brush 130 or the like is fitted and fixed into a brush holder-receiving section 190 formed at an opening edge 153b of the cylindrical section 153.

The yoke 105 is a bottomed cylindrical member formed of a metal such as iron or the like through pressing by deep drawing, or the like.

The cylindrical section 153 occupying most of the yoke 105 is constituted by a pair of flat sections 161 opposing each other in the radial direction with the central axis O interposed therebetween when seen from a plan view in the axial direction, and an arc-shaped section 163 connecting the pair of flat sections 161.

A clearance of the flat section 161 is set to be slightly larger than the diameter of the armature 106 disposed in the cylindrical section 153. Further, a clearance of the flat sections 161 is set to correspond to a clearance of flat walls 122a of a brush holder 122 (to be described below).

The arc-shaped section 163 is formed to straddle the opposite flat sections 161, and connects end sections in the circumferential direction of the opposite flat sections 161. A center of curvature of the arc-shaped section 163 is set to be equal to a rotation center (i.e., the central axis O) of the armature 106 when seen from a plan view in the axial direction. In addition, a radius of curvature of an inner circumferential surface 163a of the arc-shaped section 163 is set to be slightly larger than a dimension obtained by adding a thickness of a permanent magnet 107 (to be described below) to a radius of the armature 106.

The permanent magnet 107 is installed at an inner circumferential surface 153a of the cylindrical section 153 of the yoke 105. A rare earth element magnet such as neodymium sintering magnet or a neodymium bond magnet, a ferrite magnet, or the like, is used for the permanent magnet 107. The permanent magnet 107 is formed in substantially an arc shape when seen from a plan view in the axial direction.

A radius of curvature of the inner circumferential surface of the permanent magnet 107 is set to be slightly larger than a radius of the armature 106. In addition, a radius of curvature of the outer circumferential surface of the permanent magnet 107 is set to be substantially equal to a radius of curvature of the inner circumferential surface 163a of the arc-shaped section 163 formed at the cylindrical section 153. In addition, a length in the axial direction of the permanent magnet 107 is set to be substantially equal to a length in the axial direction of the cylindrical section 153 of the yoke 105.

In addition, the outer circumferential surface of the four permanent magnets 107 are directed toward the arc-shaped section 163 side of the cylindrical section 153 and fixed to the inner circumferential surface 163a of the arc-shaped section 163. Further, the permanent magnet 107 is attached to the inner circumferential surface 163a of the arc-shaped section 163 by an adhesive or the like.

The four permanent magnets 107 are disposed such that the magnetic N poles and S poles are alternately disposed in the circumferential direction. Then, the four permanent magnets 107 are disposed such that the magnetic N poles and S poles are opposing each other. In addition, a pitch angle of the neighboring permanent magnets 107 is set to be about 90°. That is, the electric motor 102 constitutes a motor of a bipolar pair.

A boss 119 protruding outward along the central axis O is formed at substantially a center of a bottom wall 151 of the yoke 105. A bearing 118 formed of an annular metal or the like is press-fitted and fixed to an inner circumferential surface of the boss 119. One end side (the right side of FIG. 9) of a rotary shaft 103 is axially supported by the boss 119 of the yoke 105 via the bearing 118.

In addition, a thrust plate 154 is installed at a bottom section of the boss 119. The thrust plate 154 receives a thrust load of the rotary shaft 103 via a steel ball 155. The steel ball 155 absorbs core deviation of the rotary shaft 103 while reducing sliding resistance between the rotary shaft 103 and the thrust plate 154.

The brush holder-receiving section 190 is integrally formed with the cylindrical section 153 of the yoke 105 at the opening edge 153b side (the left side of FIG. 9). A circumferential wall 190a of the brush holder-receiving section 190 is configured to receive the brush holder unit 120 (to be described below). The circumferential wall 190a of the brush holder-receiving section 190 is formed in a substantially oval shape when seen from a plan view in the axial direction, one direction in the radial direction (the upward/downward direction of FIG. 10) is a longitudinal direction, and the other direction in the radial direction (the leftward/rightward direction of FIG. 10) is a lateral direction.

The circumferential wall 190a of the brush holder-receiving section 190 has a pair of flat sections 191 having flat surfaces opposing each other in the lateral direction, and a pair of arc-shaped sections 192 formed to straddle the pair of flat sections 191 and connecting end sections in the circumferential direction of the flat sections 191 opposing each other in the longitudinal direction.

The pair of flat sections 191 and the pair of arc-shaped sections 192 of the brush holder-receiving section 190 are formed to correspond to an exterior of the brush holder 122 (to be described below). That is, a clearance of the flat sections 191 of the brush holder-receiving section 190 is set to correspond to a width of the flat wall 122*a* of the brush holder 122. In addition, a radius of curvature of an inner circumferential surface of the arc-shaped section 192 of the brush holder-receiving section 190 is set to correspond to a radius of curvature of an arc-shaped wall 122*b* of the brush holder 122.

In addition, an outer flange section 152 configured to fasten and fix the electric motor 102 to a worm gear speed reduction mechanism 104 is installed at the circumferential wall 190*a* of the brush holder-receiving section 190 side.

The outer flange section 152 is formed in a substantially pentagonal shape when seen from a plan view in the axial direction to be elongated in the longitudinal direction of the brush holder-receiving section 190, and a portion thereof that becomes a peak is formed to be disposed at a position in the longitudinal direction. In addition, a width in the lateral direction of the outer flange section 152 is set to be slightly larger than a width of the pair of flat sections 191 formed at the brush holder-receiving section 190.

In addition, one bolt hole (not shown) is formed at the portion that becomes the peak at one end side (the upper side of FIG. 10) in the longitudinal direction of the outer flange section 152, and bolt holes (not shown) are formed in the other end side (the lower side of FIG. 10) at each corner section. Bolts 144 are inserted through each of the bolt holes.
(Armature)

The armature 106 rotatably installed in the cylindrical section 153 of the yoke 105 includes an armature core 108 fitted and fixed onto the rotary shaft 103, an armature coil (not shown) wound on the armature core 108, and a commutator 110 disposed at the other end side of the rotary shaft 103. The armature core 108 is formed by stacking the plurality of ring-shaped plate members 111 formed of an electromagnetic steel sheet or the like in the axial direction.

As shown in FIG. 10, ten teeth 112 each formed in substantially a T shape when seen from a plan view in the axial direction are radially disposed at an outer circumferential section of the plate member 111 in the circumferential direction at equal intervals. Each of the teeth 112 is constituted by a winding trunk section 112*a* extending in the radial direction, and an outer circumferential section 112*b* formed at a distal end of the winding trunk section 112*a* and overhanging in the circumferential direction.

A groove-shaped slot 113 extending in the axial direction is formed in an outer circumference of the armature core 108. The slot 113 is formed by fitting and fixing the plurality of plate members 111 onto the rotary shaft 103 and formed between the outer circumferential sections 112*b* of the neighboring teeth 112. Since the number of teeth is ten as described above, the number of slots 113 between the teeth 112 is also ten.

In addition, since the teeth 112 are disposed in the circumferential direction at equal intervals, the plurality of slots 113 are also formed in the circumferential direction at equal intervals.

An insulator (not shown) formed of an insulating material such as a resin or the like is formed between the slots 113.

Then, a winding (not shown) is wound on the winding trunk section 112*a* of the teeth 112 via the insulator. Accordingly, a plurality of armature coils (not shown) are formed at an outer circumference of the armature core 108.

Ten segments 115 formed of a conductive material are attached to the outer circumferential surface of the commutator 110 fitted and fixed onto the other end side (the left side of FIG. 9) of the rotary shaft 103.

The segments 115 are formed by a plate-shaped metal piece elongated in the axial direction. Then, the segments 115 are fixed in parallel in the circumferential direction at equal intervals and insulated from each other. Accordingly, the electric motor 102 is a direct current motor constituted by four poles, ten slots and ten segments in which the number of permanent magnets 107 is four, the number of slots 113 is ten, and the number of segments 115 is ten.

A riser (not shown) bent to return to the outer diameter side is integrally formed with the end section of each of the segments 115 near the armature core 108. The winding of the armature coil is hooked around the riser, and the winding is fixed to the riser by, for example, fusing. Accordingly, the segments 115 and the armature coil corresponding thereto are electrically connected.

The brush 130 (see FIG. 11) configured to supply power to the segments 115 is in sliding contact with the segments 115. Here, the brush 130 is installed at the brush holder 122 received in the circumferential wall 190*a* of the brush holder-receiving section 190.
(Brush Holder Unit)

Figure 11:
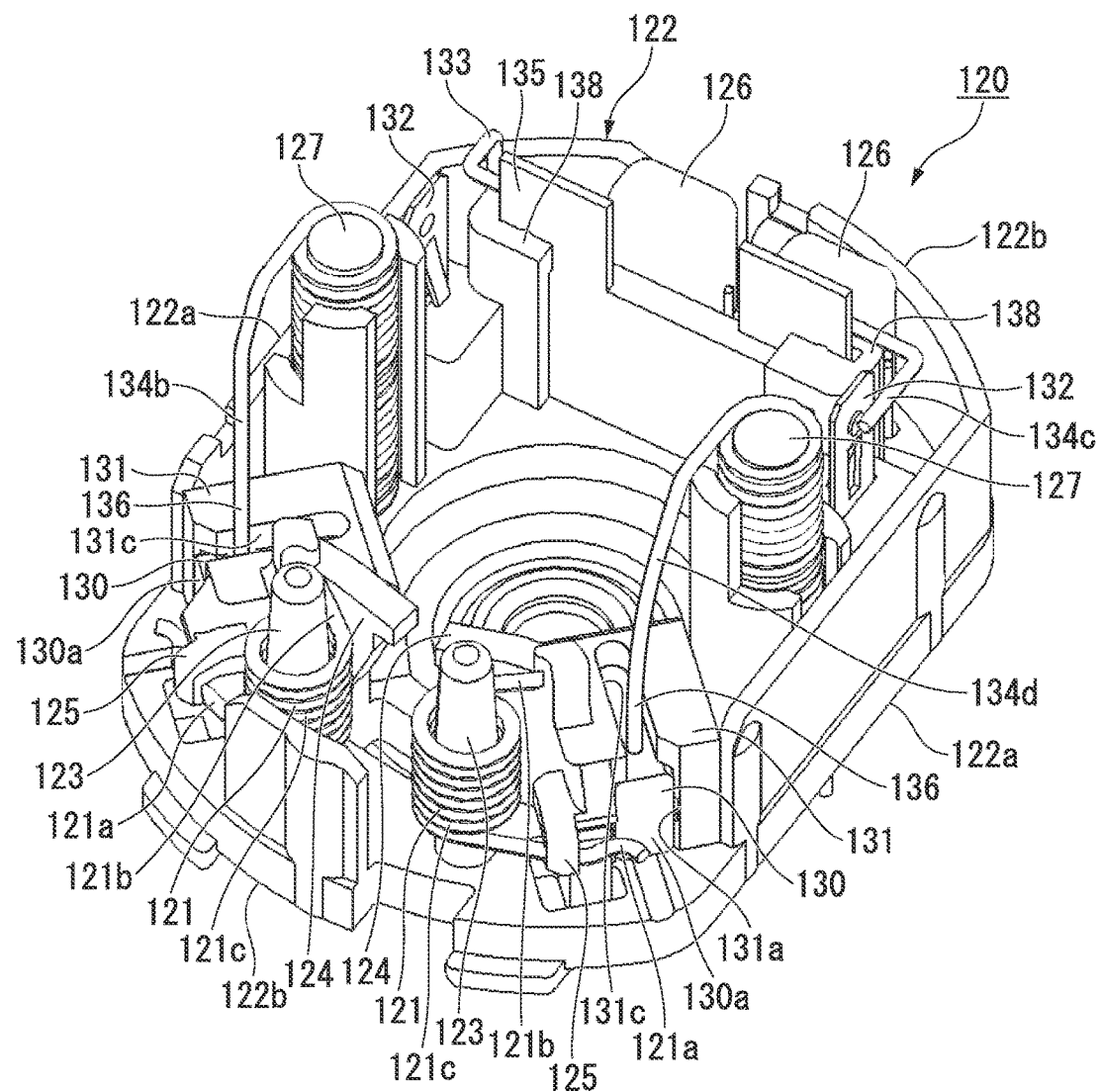
FIG. 11 is a perspective view of a brush holder unit according to the third embodiment.
Figure 12:
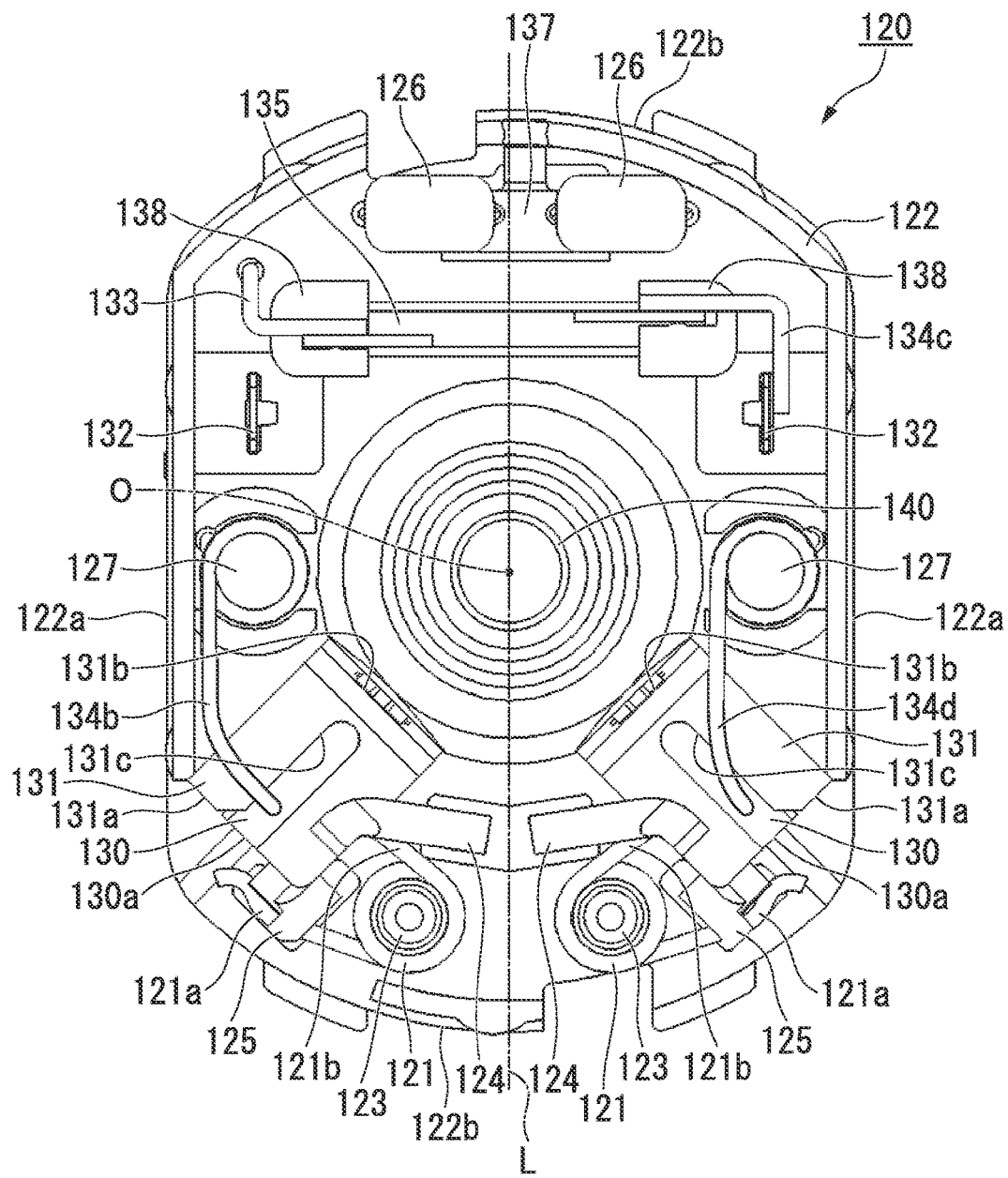
FIG. 12 is a plan view of the brush holder unit according to the third embodiment.
Figure 13:
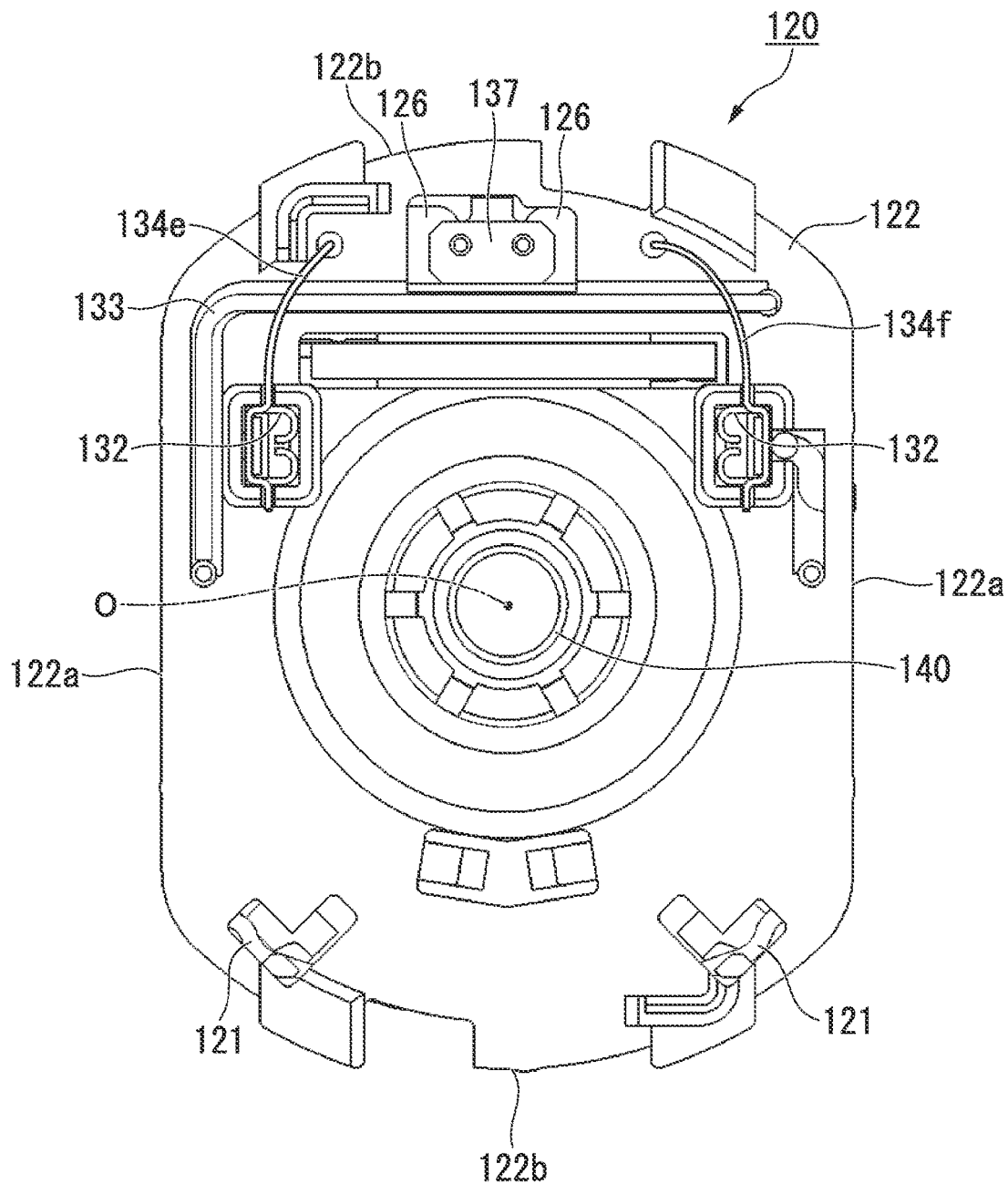
FIG. 13 is a bottom view of the brush holder unit according to the third embodiment.

FIG. 11 is a perspective view of the brush holder unit 120, FIG. 12 is a plan view of the brush holder unit 120, and FIG. 13 is a bottom view of the brush holder unit 120.

The brush holder unit 120 is constituted by the brush holder 122 constituting a main body portion, a terminal 132 passing through the brush holder 122, a spring 121 configured to bias the brush 130, a jumper wire 133 (see FIG. 13) and lead wires 134 (134*a* to 134*f*) configured to electrically connect respective parts (see FIG. 12) on the brush holder unit 120, a condenser 126 and a choke coil 127 configured to suppress noises of current supplied from an external power supply, and a heat protection element 135 configured to protect the electric motor 102 from overcurrent.
(Brush Holder)

The brush holder 122 is a member formed of a resin or the like in a substantially oval shape when seen from a plan view in the axial direction. The brush holder 122 has the pair of flat walls 122*a* having the flat surfaces opposing each other in the lateral direction, and the pair of arc-shaped walls 122*b* disposed at both ends in the longitudinal direction and installed to straddle the pair of flat walls. The brush 130, the terminal 132, the jumper wire 133, the lead wires 134, the condenser 126, the choke coil 127, and the heat protection element 135 are disposed at a region surrounded by the pair of flat walls 122*a* and the pair of arc-shaped walls 122*b*.

A through-hole 122*c* passing through the brush holder 122 is formed at substantially a center of the brush holder 122, and becomes a bearing section configured to axially support the rotary shaft 103. A sliding bearing 140 is press-fitted into the through-hole 122*c*. The sliding bearing 140 has a substantially spherical exterior shape, and is tilted while being assembled to the through-hole 122*c*. Accordingly, as the sliding bearing 140 is tilted, even when the rotary shaft 103 is axially deviated, a load generated by the sliding resistance can be suppressed to a minimum level, and the rotary shaft 103 can be efficiently rotated.

In addition, the terminals 132 are installed at both sides of the brush holder 122 closer to the arc-shaped wall 122*b* side (the upper side of FIG. 12) than the through-hole 122c with a straight line L (see FIG. 12) in the longitudinal direction passing the central axis O when seen from a plan view in the axial direction and interposed therebetween. The terminal 132 is a member formed of a metal such as copper or the like.

The terminal 132 passes through the brush holder 122 in the axial direction, and a harness (not shown) or the like extending from the external power supply is connected to the terminal 132 at the outside of the brush holder 122 (a surface side shown in FIG. 13) and electrically connected to the external power supply.

In addition, a holder section 131 configured to receive the brush 130 is installed inside the arc-shaped wall 122b in the longitudinal direction of the brush holder 122. The holder section 131 is formed in a substantially rectangular parallelepiped shape to cover the brush 130 with a shape corresponding to the brush 130. The holder sections 131 are formed such that the longitudinal direction of the holder section 131 is in the radial direction of the electric motor 102 and spaced apart from each other in the circumferential direction by 90° at mechanical angles, and both ends thereof in the radial direction are opened. That is, the holder section 131 is formed in a box shape of a substantially rectangular parallelepiped, and the brush 130 is received in the holder section 131 in the radial direction.

In addition, a slit 131c is formed in a wall section of the holder section 131 near the yoke (the upper side of FIG. 11). The slit 131c is formed in the longitudinal direction of the holder section 131 and in the radial direction. A width of the slit 131c is set to be larger than a diameter of a pigtail 136 extending from the brush 130 (to be described below).

A pressing section 121a of the spring 121 (to be described below) is disposed at an opening section 131a of an outer diameter side of the holder section 131. In addition, an inner diameter-side end surface of the brush 130 pressed by the spring 121 protrudes from an opening section 131b of an inner diameter side of the holder section 131 and comes in sliding contact with the segments 115. In this way, the inner diameter-side end surface of the brush 130 is received in the holder section 131 to be protrudable and withdrawable in the radial direction.

The brush 130 received in the brush holder 122 is a member formed of a conductive material such as carbon or the like having a substantially rectangular parallelepiped shape, and formed in a substantially rectangular parallelepiped shape. The two brushes 130 are installed at the brush holder 122, one of the brushes is an anodic brush, and the other brush is a cathodic brush. The pair of brushes 130 are disposed such that the longitudinal direction of the brush 130 is in the radial direction of the electric motor 102 and spaced apart from each other at mechanical angles at a 90° interval in the circumferential direction.

The outer diameter-side end surface 130a in the longitudinal direction of the brush 130 is formed to be flat, and the pressing section 121a of the spring 121 (to be described below) abuts the end surface 130a. Then, the brush 130 is pressed against the inner diameter side by the spring 121.

In addition, the pigtail 136 extends from the brush 130 in the axial direction. The pigtail 136 is a stranded wire formed of copper or the like. One end side of the pigtail 136 is connected to the brush 130 by, for example, solder or the like. In addition, the other end side of the pigtail 136 is connected to the choke coil 127 (to be described below) by, for example, solder or the like. The pigtail 136 extends outward via the slit 131c formed in the holder section 131.

The spring 121 is disposed in the vicinity of the holder section 131 in the lateral direction of the brush 130 (the circumferential direction of the arc-shaped wall 122b). The spring 121 is disposed between the two brushes 130 disposed at mechanical angles at a 90° interval in the circumferential direction.

The spring 121 is a so-called torsion coil spring formed of a linear metal member such as steel or the like, and a commercial product may be used thereas.

In addition, the springs 121 need to equally press each of the two brushes 130. Accordingly, as shown in FIG. 12, when the two the springs 121 are disposed between the two brushes, shapes of the springs 121 are formed to have linear symmetry with respect to the straight line L (see FIG. 12).

The spring 121 has a cylindrical winding section 121c on which a linear metal member is spirally wound. The winding section 121c is inserted into a spring insertion section 123 vertically installed in the vicinity of the holder section 131 in the axial direction.

In addition, the pressing section 121a extending in a tangential direction of the winding section 121c is formed at one end side (the lower side of FIG. 11) of the winding section 121c. A distal end of the pressing section 121a is formed to be curved toward the inner diameter side. The pressing section 121a is hooked and held by a hooking section 125 formed at an outer diameter side of the holder section 131, and a curved portion of the distal end of the pressing section 121a abuts an outer diameter-side end surface 130a of the brush 130. Then, the brush 130 is pressed against the inner diameter side by a biasing force of the spring 121.

A hooking section 121b extending in the tangential direction of the winding section 121c is formed at the other end side (the upper side of FIG. 11) of the winding section 121c. The hooking section 121b is hooked by the biasing force of the spring 121 in a state in which a support wall 124 formed at an inner diameter side of the spring insertion section 123 is pressed.

The choke coil 127 is disposed at an opposite side of the spring 121 with the brush 130 sandwiched therebetween and inside the flat wall 122a of the brush holder 122. The choke coil 127 is formed by winding a copper wire on a magnetic material such as ferrite or the like. The choke coil 127 is used to prevent a high frequency component of the current from flowing to an electric circuit 139 (see FIG. 14) installed at the brush holder unit 120 and suppress generation of noises.

One end side of the choke coil 127 is connected to the pigtail 136 of the brush 130. In addition, the other end side of the choke coil 127 is connected to the terminal 132 configured to supply power from an external power supply via the lead wire 134 or the jumper wire 133.

The heat protection element 135 configured to protect the electric circuit 139 is disposed at an opposite side of the brush 130 with the central axis O (the rotary shaft 103) sandwiched therebetween. The heat protection element 135 is a flat plate member having a substantially rectangular shape. The heat protection element 135 is sandwiched by a heat protection element holding section 138 formed at the brush holder 122 in substantially a U shape when seen from a plan view in the axial direction, and held while vertically installed in the axial direction.

As the heat protection element 135, for example, a positive temperature coefficient thermistor (PTC thermistor) is employed. The PTC thermistor is an element configured to increase electrical resistance according to an increase in temperature. For example, when a rotational load or the like of the electric motor 102 is increased, the overcurrent flows and the electric motor 102 is overheated, the overcurrent flowing through the electric circuit 139 is cut to protect the electric circuit 139. Further, as the heat protection element 135, instead of the PTC thermistor, a circuit breaker formed of a bimetal, a fuse or the like configured to be melted and cut by overcurrent may be employed.

In addition, as a noise prevention element, the condenser 126 is disposed at an opposite side of the central axis O (the rotary shaft 103) with the heat protection element 135 sandwiched therebetween. The condenser 126 blocks the high frequency component of the current from flowing to the electric circuit 139 installed at the brush holder unit 120. The two condensers 126 are installed, and connected to the brush 130 by the lead wires 134e and 134f.

A middle point terminal 137 is connected between the two condensers 126. The middle point terminal 137 is grounded and emits the high frequency component. Further, in the third embodiment, while the two condensers 126 are used, the number of condensers is varied according to electrostatic capacity required for removing the noises.

Figure 14:
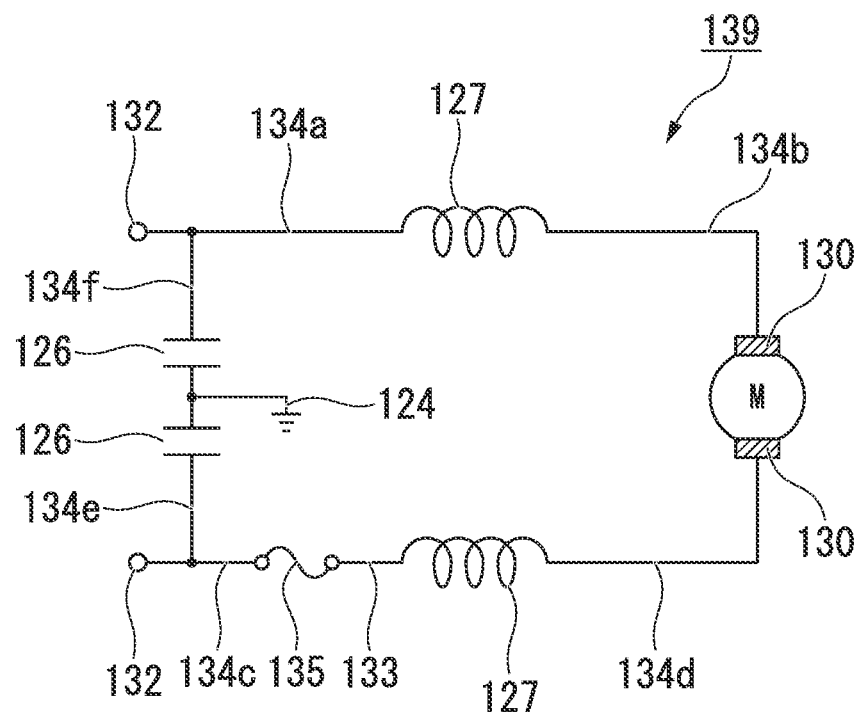
FIG. 14 is a view for describing an electric circuit according to the third embodiment.

FIG. 14 is a view describing the electric circuit 139.

As shown in FIG. 14, as the brushes 130, the choke coil 127, the heat protection element 135 and the condenser 126 are electrically connected to each other, the electric circuit 139 is configured on the brush holder unit 120.

The brush 130 and the choke coil 127 are connected to each other in series via the lead wires 134a, 134b, 134c and 134d. The choke coil 127 of one side (the right side of FIG. 12) and the heat protection element 135 are connected in series via the jumper wire 133. The condensers 126 are connected to the choke coil 127 in parallel via the lead wires 134e and 134f, and constitute a so-called low pass filter with the choke coil 127.

The brush holder unit 120 configured as above is received in the brush holder-receiving section 190 formed at the yoke 105. The brush holder unit 120 is fitted into the brush holder-receiving section 190 through swaging or the like in a state in which the flat section 191 of the brush holder-receiving section 190 comes in contact with the flat wall 122a of the brush holder 122 and the arc-shaped section 192 of the brush holder-receiving section 190 comes in contact with the arc-shaped wall 122b of the brush holder 122. That is, the brush holder unit 120 is installed to close the opening of the yoke 105.

In addition, in the electric motor 102 formed as described above, the bolt 144 is inserted through the bolt hole formed in the outer flange section 152 of the yoke 105 and fixed to the worm gear speed reduction mechanism 104 through threaded engagement.

A gear housing 143 configured to receive a worm shaft 145 and a worm wheel 146 is installed at the worm gear speed reduction mechanism 104.

The worm shaft 145 is accommodated in a worm shaft accommodating section 147 formed at the gear housing 143. The worm shaft 145 is connected to the other end side (the left side of FIG. 9) of the rotary shaft 103 of the electric motor 102 via a joint member 188 such as a coupling or the like.

The worm shaft 145 is installed concentrically with the rotary shaft 103. In addition, the other end side of the worm shaft 145 is rotatably supported by a bearing 141 installed at the worm shaft accommodating section 147. Further, like the rotary shaft 103, a thrust plate 158 and a steel ball 157 are installed at the other end side (the left side of FIG. 9) of the worm shaft 145, and receive a thrust load of the worm shaft 145.

An output shaft 148 is installed at the worm wheel 146 meshed with the worm shaft 145. The output shaft 148 is connected to the worm wheel 146 to be rotatable therewith, and installed in a direction perpendicular to the rotary shaft 103 of the electric motor 102. Then, as the output shaft 148 is rotated, an electric component such as a power window, a sunroof, an electric seat, a wiper apparatus, or the like, of the vehicle is operated.

(Effects)

According to the electric motor 102 of the third embodiment, since the heat protection element 135 is disposed at an opposite side of the two brushes 130 with the rotary shaft 103 sandwiched therebetween, components of the electric motor 2 can be efficiently disposed using a space in which the two brushes 130 are not disposed. In particular, reduction of the size of the electric motor 102 in which the number of magnetic poles is four and the two brushes are disposed at mechanical angles at a 90° interval in the circumferential direction becomes possible.

In addition, since the heat protection element 135 can be disposed in the vicinity of the rotary shaft 103, a temperature of each component of the armature 106 and the electric circuit 139 can be precisely detected and current flowing through the electric circuit 139 can be cut.

Here, the brush holder unit 120 is set to close the opening of the yoke 105. Accordingly, the heat protection element 135 can precisely detect the temperature of the armature coil wound on the armature 106, which is particularly likely to generate heat, and can effectively protect the armature coil from heat damage.

In addition, according to the electric motor 102 of the third embodiment, since the brush holder 122 is formed in an oval shape when seen from a plan view in the axial direction, in comparison with the case in which the brush holder 122 is formed in a circular shape when seen from a plan view in the axial direction, reduction in size and thickness of the electric motor 102 can be performed.

Further, since the brush 130 and the heat protection element 135 are disposed inside the arc-shaped wall 122b of the brush holder 122, components of the electric motor 102 can be efficiently disposed in the longitudinal direction of the brush holder 122. Accordingly, since the components of the electric motor 102 can be efficiently disposed, the electric motor 102 can be reduced in size.

In addition, in the electric motor 102 of the third embodiment, the condenser 126 serving as the noise prevention element is disposed at an opposite side of the rotary shaft of the armature 106 with the heat protection element 135 sandwiched therebetween. As described above, the heat protection element 135 is a member having a flat plate shape, and is vertically installed in the axial direction. For this reason, a periphery of the condenser 126 is surrounded by the arc-shaped wall 122b of the brush holder 122 and the heat protection element 135.

Accordingly, according to the electric motor 102 of the third embodiment, since the heat protection element 135 has a function of a protective wall, conductive wear debris generated from the brush 130 can be prevented from being attached to the condenser 126. Accordingly, for example, generation of defects of the electric circuit 139 such as attachment of the wear debris between the terminals around the two condensers 126 can be suppressed.

In addition, according to the electric motor 102 of the third embodiment, since the brush holder-receiving section 190 configured to receive the brush holder 122 is integrally formed with the opening edge 153b of the cylindrical section 153, the brush holder-receiving section 190 can be formed at a low cost.

In addition, according to the electric motor 102 of the third embodiment, since the choke coil 127 is disposed inside the pair of flat walls 122a disposed between the two brushes 130 and the heat protection element 135 and formed at the brush holder 122, the choke coil 127 can be efficiently disposed while effectively utilizing the space. Accordingly, even when the choke coil 127 is installed as a countermeasure for noises, the electric motor 102 can be reduced in size.

In addition, according to the electric motor 102 of the third embodiment, since the condensers 126 and the choke coils 127 are installed, the low pass filter can be installed in the electric circuit 139 by connecting the condensers 126 in parallel and connecting the choke coils 127 in series. Accordingly, since the high frequency noises are removed, the high performance electric motor 102 can be provided.

Further, in the third embodiment, the case in which the worm gear speed reduction mechanism 104 is connected to the electric motor 102 has been described. However, connection of the electric motor 102 is not limited to the worm gear speed reduction mechanism 104, and the electric motor 102 may be connected to an actuator mechanism in addition to the worm gear speed reduction mechanism 104, or another external instrument.

In the third embodiment, the case in which the speed-reduction-mechanism-attached motor apparatus 1 (the driving apparatus) is used to drive at least one of, for example, a power window, a sunroof, an electric seat, and a wiper apparatus of the vehicle has been described. However, use of the speed-reduction-mechanism-attached motor apparatus 1 is not limited thereto, but may be applied to various apparatuses such as electric power steering of the vehicle, or electric components other than the vehicle.

In the third embodiment, as the pair of flat sections 161 are formed at the cylindrical section 153 of the yoke 105 and disposed in the lateral direction of the brush holder 122, the electric motor 102 is reduced in size and thickness. However, as the flat sections are formed at the cylindrical section 153 of the yoke 105 in the longitudinal direction in addition to the flat section 161 in the lateral direction, the cylindrical section 153 can be reduced in size in comparison with the case in which the arc-shaped section 163 is formed in the longitudinal direction.

In the third embodiment, two of each of the condensers 126 and the choke coils 127 are installed as a countermeasure for noises. However, the numbers of the condensers 126 and the choke coils 127 are not limited thereto but may be design requirements appropriately set according to the number of turns of the armature coil, or the like.

Fourth Embodiment (Electric Motor)

Next, a fourth embodiment of the present invention will be described with reference to the accompanying drawings.

Figure 15:
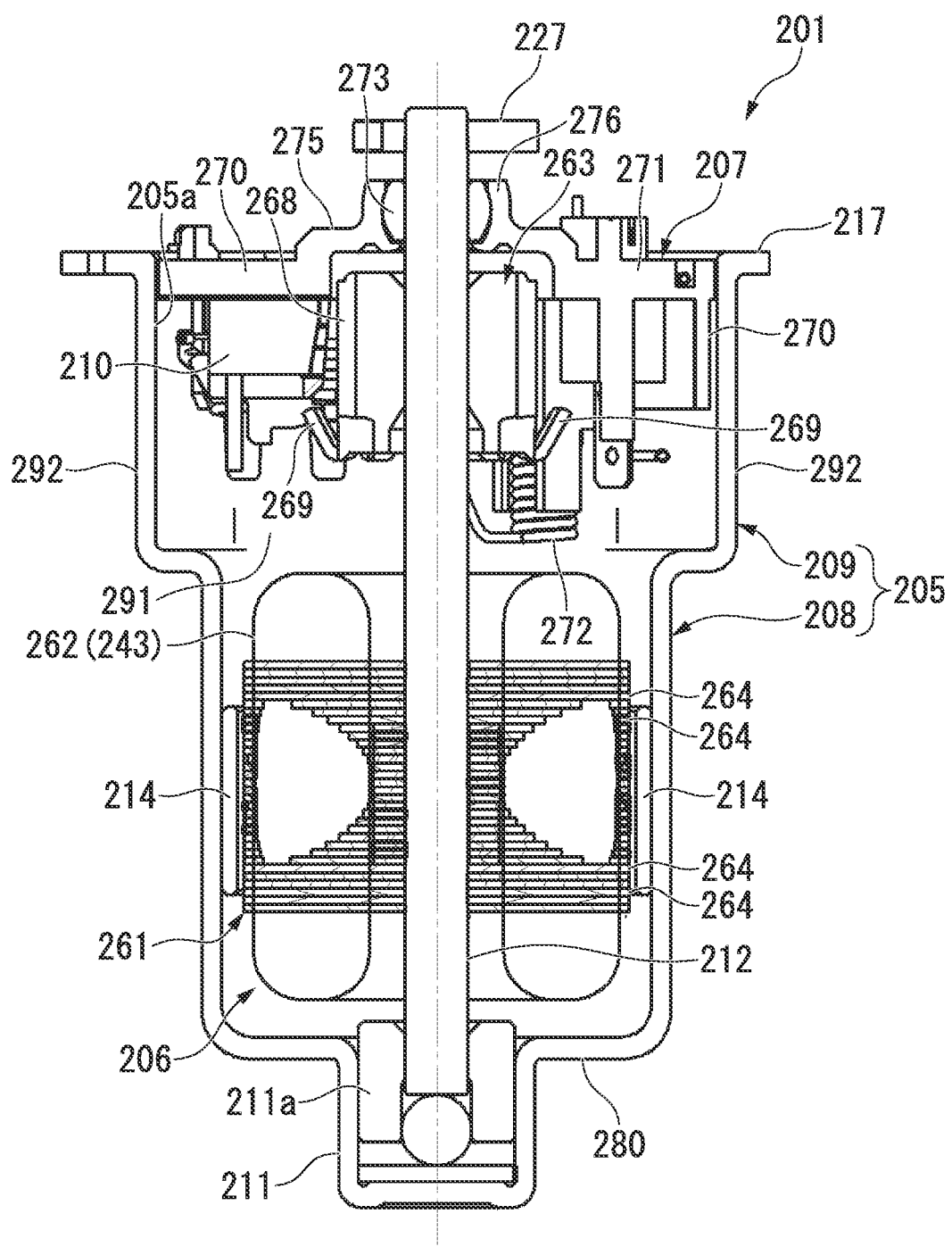
FIG. 15 is a longitudinal cross-sectional view of an electric motor according to a fourth embodiment.
Figure 16:
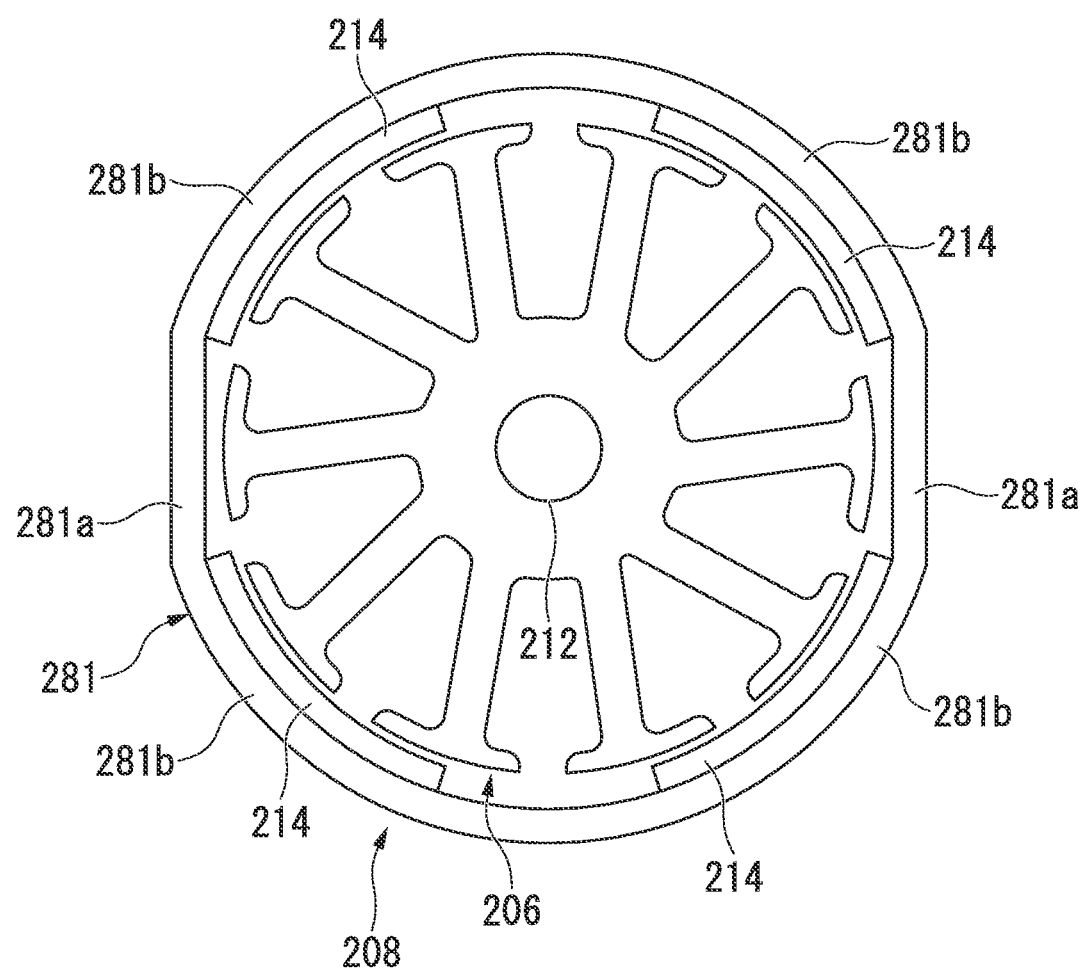
FIG. 16 is a lateral cross-sectional view of the vicinity of an armature core of the electric motor according to the fourth embodiment.

FIG. 15 is a longitudinal cross-sectional view of an electric motor, and FIG. 16 is a lateral cross-sectional view in the vicinity of an armature core of the electric motor.

As shown in FIGS. 15 and 16, an electric motor 201 is integrated with a speed reduction mechanism (not shown), and for example, is used to drive a power window or a sunroof of a vehicle. The electric motor 201 has an armature 206 rotatably installed in a bottomed cylindrical motor case 205, and a brush holder unit 207 fitted and fixed into an opening section 205a side of the motor case 205.

The motor case 205 is formed through deep drawing by pressing a metal plate, and is constituted by a bottomed cylindrical yoke 208 and a brush holder-receiving section 209 integrally formed with an opening section end of the yoke 208. That is, the opening section of the brush holder-receiving section 209 becomes the opening section 205a of the motor case 205.

A bottomed cylindrical boss section 211 protruding outward in the axial direction is integrally formed with a bottom section 180 of the yoke 208 at substantially a center in the radial direction, and a bearing 211a is inserted thereinto from inside. The bearing 211a is configured to rotatably support one end of a rotary shaft 212 of the armature 206 and receive a radial load or a thrust load.

A circumferential wall 281 of the yoke 208 is constituted by a pair of flat sections 281a disposed to oppose each other about the rotary shaft 212, and arc-shaped sections 281b connecting end sections in the circumferential direction of each of the pair of flat sections 281a.

In addition, four permanent magnets 214 are installed at inner surfaces of the arc-shaped sections 281b of the circumferential wall 281 of the yoke 208 distant from the flat sections 281a. A rare earth element magnet such as a neodymium sintering magnet or a neodymium bond magnet, a ferrite magnet, or the like is used as the permanent magnet 214. The permanent magnet 214 is formed in a substantially arc-shaped cross-section to correspond to a radius of curvature of the arc-shaped section 281b. In addition, the four permanent magnets 214 are disposed such that magnetic N poles and S poles are alternately disposed in the circumferential direction and the magnetic N poles and S poles are opposing each other.

The brush holder-receiving section 209 integrally formed with the opening section end of the yoke 208 is formed in a substantially oval shape to be elongated in a direction perpendicular to the axial direction. That is, a circumferential wall of the brush holder-receiving section 209 has a pair of flat sections 291 and 291 formed in a rectangular shape when seen from a plan view and disposed to oppose each other in the radial direction with the rotary shaft 212 sandwiched therebetween, and a pair of arc-shaped sections 292 and 292 connecting both ends in the circumferential direction of the flat sections 291 and 291, i.e., both ends in the longitudinal direction.

The pair of flat sections 291 and 291 are installed to be flush with each of the flat sections 281a of the yoke 208 disposed to oppose each other about the rotary shaft 212.

An outer flange section 217 configured to fasten and fix the electric motor 201 to a speed reduction mechanism (not shown) is formed at an opening section end of the brush holder-receiving section 209. A plurality of bolt holes (not shown) are formed in the outer flange section 217.

The armature 206 rotatably installed in the motor case 205 includes an armature core 261 fitted and fixed onto a position of the rotary shaft 212 corresponding to the yoke 208, an armature coil 262 (coils C1 to C5' (see FIG. 19, details will be described below)) wound on the armature core 261, and a commutator 263 disposed at the other end side (the upper side of FIG. 15) of the rotary shaft 212 and fitted and fixed onto a position thereof corresponding to the brush holder-receiving section 209.

The other end of the rotary shaft 212 protrudes outward in the axial direction farther than the brush holder unit 207, and a joint motor 227 formed in a trifurcated shape is attached to the protruded portion. The joint motor 227 is connected to the speed reduction mechanism (not shown) attached to a distal end thereof, and has a function of transmitting a rotational force of the rotary shaft 212 to the speed reduction mechanism.

The commutator 263 is fitted and fixed onto the other end side of the rotary shaft 212. Ten segments 268 formed of a conductive material are attached to an outer circumferential surface of the commutator 263.

The segments 268 are formed of a plate-shaped metal piece elongated in the axial direction, and are fixed in parallel in the circumferential direction at equal intervals while insulated from each other.

A riser 269 curved to return to the outer diameter side is integrally formed with the end section of each of the segments 268 near the armature core 261. A winding start end 243*a* and a winding stop end 243*b* (see FIG. 19) of the armature coil 262 are hooked on the riser 269, and these ends are fixed to the riser 269 through fusing. Accordingly, the segment 268 and the armature coil 262 corresponding thereto are electrically connected.

A brush 210 installed at the brush holder unit 207 received in the brush holder-receiving section 209 comes in sliding contact with the segment 268. The brush holder unit 207 has a box-shaped brush holder 270 opened at the armature core 261 side. The brush 210 is installed in the brush holder 270 to be biased toward the segment 268. The brush 210 is electrically connected to the external power supply (not shown) and the segment 268 through sliding contact with the segment 268 of the commutator 263. Accordingly, power of the external power supply (not shown) is supplied to the armature coil 262.

In addition, a bulging portion 275 is formed at a bottom wall 271 of the brush holder 270 to overhang outward from a central section in the axial direction, i.e., toward an opposite side of the armature core 261. A bearing section 276 is integrally formed with a center of the bulging portion 275. A sliding bearing 273 configured to rotatably support the other end of the rotary shaft 212 is press-fitted into the bearing section 276.

Further, a noise prevention element such as a choke coil 272 or the like is installed in the brush holder 270 in the middle of a power line between the brush 210 and the external power supply (not shown). Alternatively, a condenser (not shown) or the like configured to smooth the current supplied to the armature coil 262 is installed in the brush holder 270.

(Armature Core)

Figure 17:
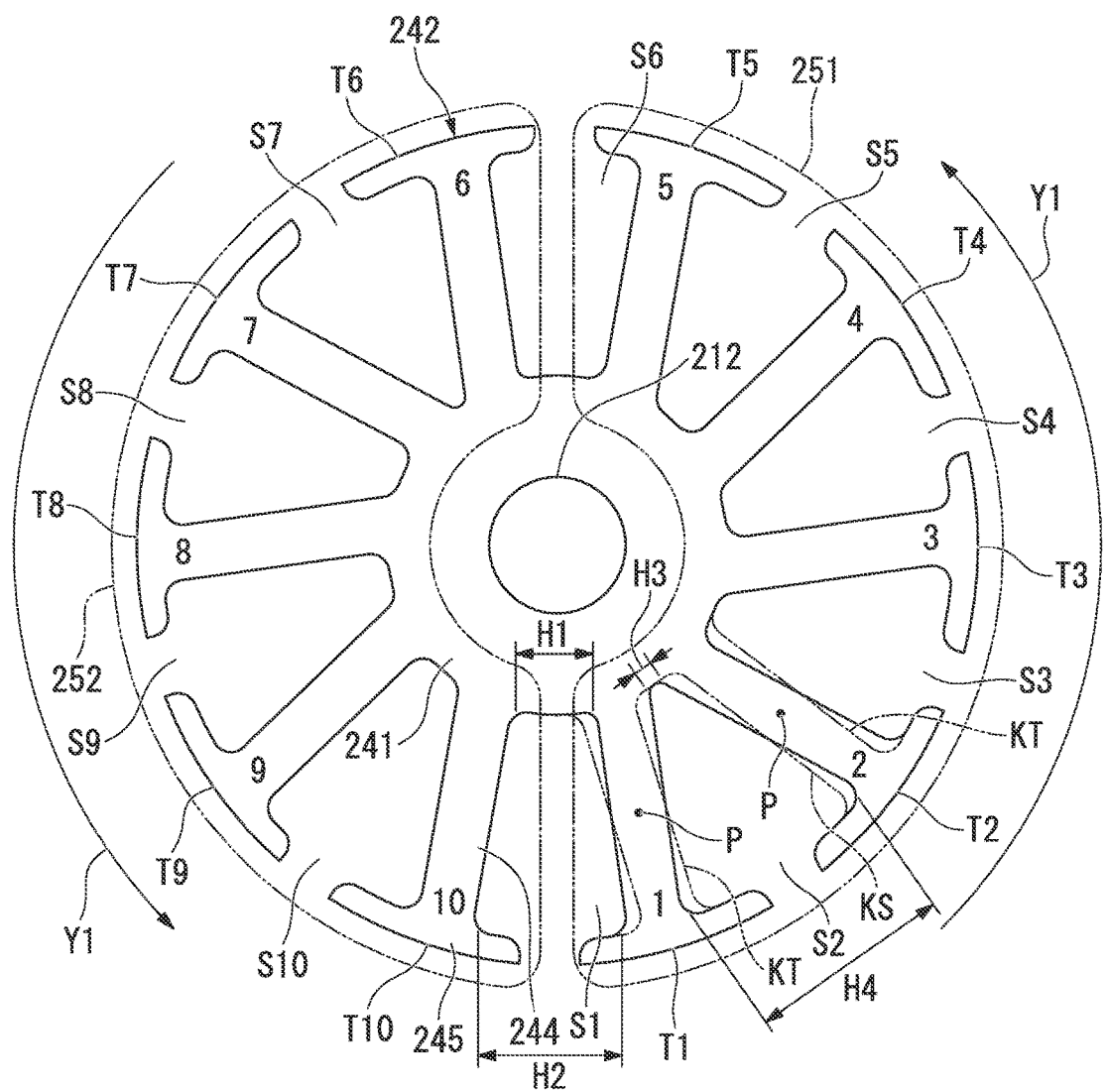
FIG. 17 is a plan view of a core plate that constitutes the armature core according to the fourth embodiment.

FIG. 17 is a plan view of a core plate that constitutes the armature core.

Here, as shown in FIG. 17, the armature core 261 on which the armature coil 262 is wound is referred to as a so-called deformed core formed in a deformed shape, which will be described below in detail.

As shown in FIGS. 15 and 17, the armature core 261 is formed by stacking a plurality of core plates 264 formed through pressing of metal plates. The core plate 264 has a ring-shaped core main body 241 fitted and fixed onto the rotary shaft 212. Ten teeth T1 to T10 (a first tooth T1 to a tenth tooth T10) are formed at an outer circumferential edge of the core main body 241 in the circumferential direction and protrude outward in the radial direction.

As the plurality of core plates 264 are stacked, ten dovetail-groove-shaped slots S1 to S10 (a first slot S1 to a tenth slot S10) are formed at the outer circumference of the armature core 261 between the neighboring teeth T1 to T10. Accordingly, the electric motor 201 is constituted by four poles, ten slots and ten segments in which the number of permanent magnets 214 is four, the number of slots S1 to S10 is ten, and the number of segments 268 is ten.

A winding 243 coated with enamel is wound on the slots S1 to S10, and thus the armature coil 262 is formed on the outer circumference of the armature core 261. Further, while a winding method of the winding 243 on the teeth T1 to T10 will be described below in detail, a winding direction of the winding 243 is counterclockwise in FIG. 17 (see an arrow Y1).

Here, each of the teeth T1 to T10 is formed in substantially a T shape when seen from a plan view in the axial direction, and has a winding trunk section 244 on which the winding 243 is wound, and a hooking section 245 integrally formed with a distal end of the winding trunk section 244 and extending in the circumferential direction. Then, the winding trunk section 244 of each of the teeth T1 to T10 is tilted with respect to a virtual standard tooth KT (shown by a two-dotted chain line in FIG. 17) radially extending in the radial direction.

The virtual standard tooth KT is a tooth formed in the case of a so-called normal core rather than the oval core and extending in parallel to the radial direction from the core main body 241, and the winding trunk section 244 of each of the teeth T1 to T10 is tilted in a predetermined direction about a reference point P of a center in the radial direction.

That is, a distal end of the winding trunk section 244 of the first tooth T1 near the hooking section 245 is tilted toward an opposite side in a winding direction Y1 of the winding 243 about the reference point P of the center in the radial direction by a predetermined angle. Here, since a position of the hooking section 245 of the first tooth T1 remains at a position of the virtual standard tooth KT, a distal end of the winding trunk section 244 is connected to an opposite side of the winding direction Y1 slightly farther than the center in the circumferential direction of the hooking section 245.

Meanwhile, a distal end of the winding trunk section 244 of the second tooth T2 near the hooking section 245 is tilted toward the winding direction Y1 of the winding 243 about the reference point P of the center in the radial direction by a predetermined angle. Here, since a position of the hooking section 245 of the second tooth T2 remains at the position of the virtual standard tooth KT, the distal end of the winding trunk section 244 is connected to the winding direction Y1 side slightly farther than a center in the circumferential direction of the hooking section 245.

In addition, the third tooth T3, the fourth tooth T4, and the fifth tooth T5 are also formed similarly to the second tooth T2.

Here, the first tooth T1 to the fifth tooth T5 constitute one tooth group 251, and the sixth tooth T6 to the tenth tooth T10 constitute another tooth group 252 disposed with point symmetry to the tooth group 251 about the rotary shaft 212. That is, the armature core 261 is constituted by the two tooth groups 251 and 252.

Thus, the sixth tooth T6 is formed to be point-symmetrical to the first tooth T1, the seventh tooth T7 is formed to be point-symmetrical to the second tooth T2, the eighth tooth T8 is formed to be point-symmetrical to the third tooth T3, the ninth tooth T9 is formed to be point-symmetrical to the fourth tooth T4, and the tenth tooth T10 is formed to be point-symmetrical to the fifth tooth T5.

The slots S1 to S10 formed between the teeth T1 to T10 are formed in a deformed shape with respect to a virtual standard slot KS formed between the neighboring virtual standard teeth KT and KT by the teeth T1 to T10 formed in this way.

That is, in the first slot S1 formed between the tenth tooth T10 and the first tooth T1, while a slot width H1 inside in the radial direction is increased with respect to the virtual standard slot KS, a slot width H2 outside in the radial direction is reduced.

In addition, in the second slot S2 formed between the first tooth T1 and the second tooth T2, while a slot width H3 inside in the radial direction is reduced with respect to the virtual standard slot KS, a slot width H4 outside in the radial direction is increased.

Further, the third slot S3 formed between the second tooth T2 and the third tooth T3 is formed to be deviated slightly toward the winding direction Y1 side with respect to the virtual standard slot KS. The fourth slot S4 and the fifth slot S5 are also formed similarly to the third slot S3.

In addition, the sixth slot S6 to the tenth slot S10 are point-symmetrical with respect to the first slot S1 to the fifth slot S5. That is, the sixth slot S6 is formed to be point-symmetrical to the first slot S1, the seventh slot S7 is formed to be point-symmetrical to the second slot S2, the eighth slot S8 is formed to be point-symmetrical to the third slot S3, the ninth slot S9 is formed to be point-symmetrical to the fourth slot S4, and the tenth slot S10 is formed to be point-symmetrical to the fifth slot S5.

(Winding Process)

Next, a winding process of the winding 243 will be described with reference to FIGS. 18A to 19.

FIGS. 18A to 18E are views describing the winding process of the winding. FIG. 19 is a development view of the armature, in which gaps between the neighboring teeth T1 to T10 correspond to the slots S1 to S10. Further, in FIG. 19, reference numerals of the segments 268 will be described.

Figure 19:
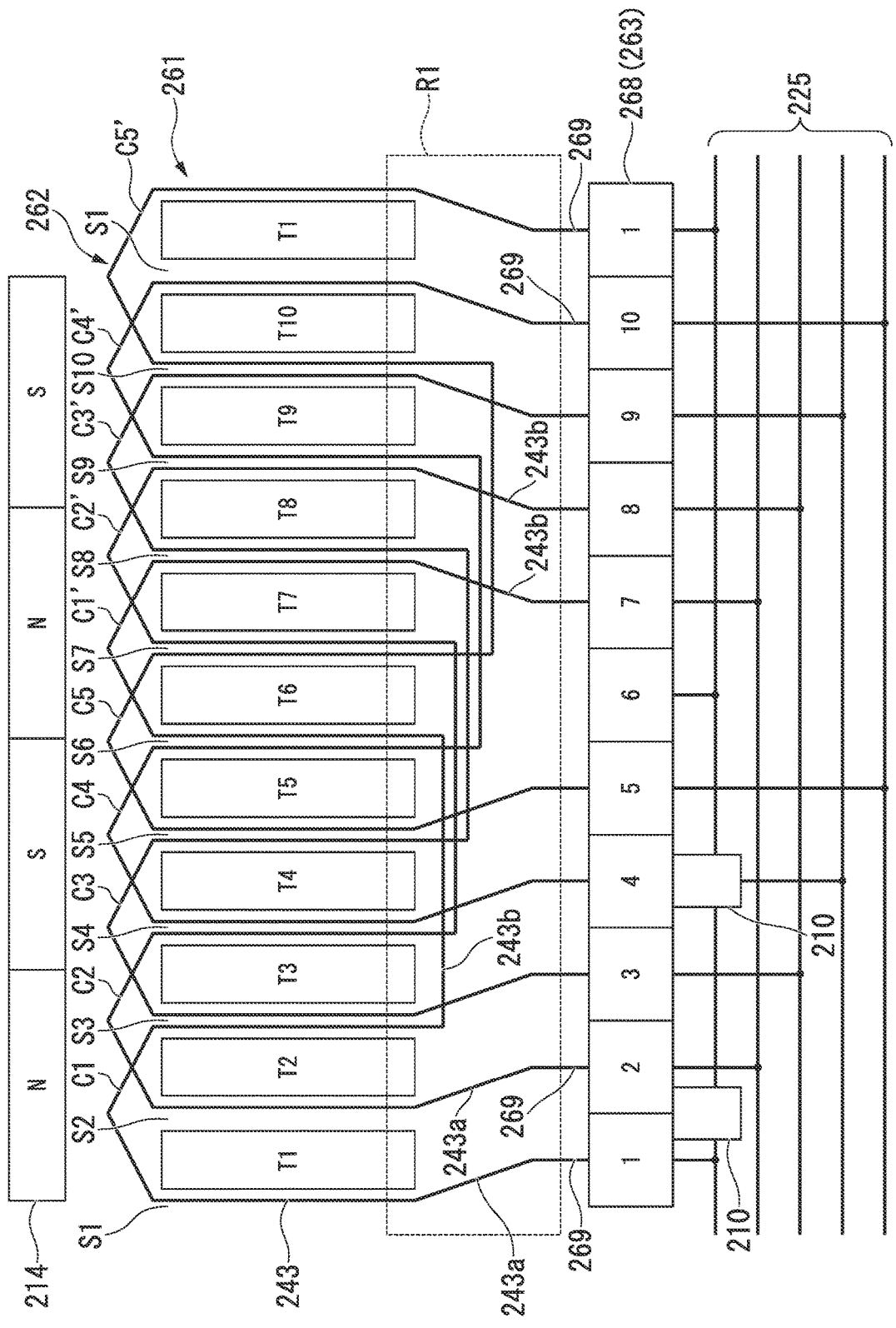
FIG. 19 is a development view of an armature according to the fourth embodiment.

Here, as shown in FIG. 19, connecting wires (equalizers) 225 are hooked on the risers 269 of the segments 268 having the same electric potential, i.e., in the fourth embodiment, the risers 269 of every fifth segment 268 in the circumferential direction. The connecting wires 225 are configured to short-circuit the segments 268 having the same electric potential, and are fixed to the risers 269 by fusing.

Figure 18A:
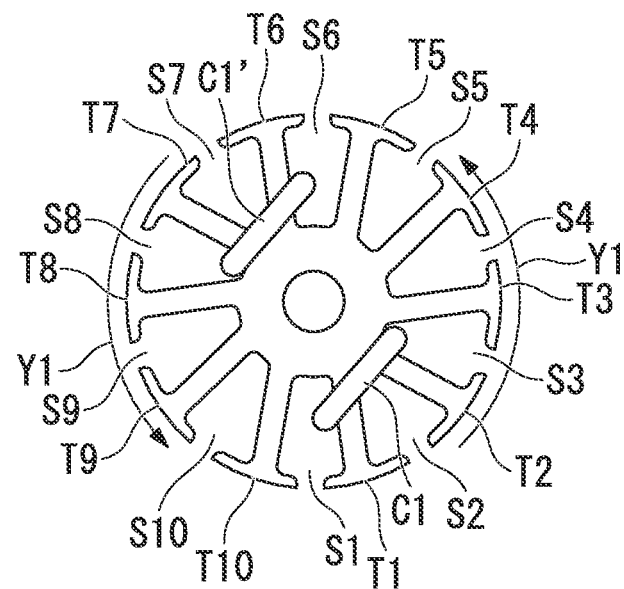
FIG. 18A is a view describing a winding process of a winding according to the fourth embodiment.

In addition, as shown in FIGS. 18A to 19, a winding method of the winding 243 on the armature core 261 is a so-called distributed winding method of winding the winding 243 between every other slot S1 to S10.

More specifically, as shown in FIGS. 18A and 19, first, the winding start end 243a of the winding 243 is hooked around the riser 269 of the first segment 268, the first segment 268 is connected to the winding 243, and then the winding 243 is pulled into the first slot S1. Then, the winding 243 is wound n times (n is a natural number) between the first slot S1 and the third slot S3 to form a first coil C1.

After that, the winding stop end 243b of the first coil C1 is pulled into the sixth slot S6. Then, the winding 243 is wound n times between the sixth slot S6 and the eighth slot S8 to form a No. 1' coil C1'. Further, the winding stop end 243b of the No. 1' coil C1' is hooked around the riser 269 of the seventh segment 268 having the same electric potential as the second segment 268 adjacent to the first segment 268, and connects the seventh segment 268 and the winding 243. Accordingly, a winding process of the first coil C1, and the No. 1' coil C1' is terminated.

Here, since the first coil C1 and the No. 1' coil C1' are coils firstly formed on the armature core 261, the coils are formed furthest inside in the radial direction of the armature core 261.

Figure 18B:
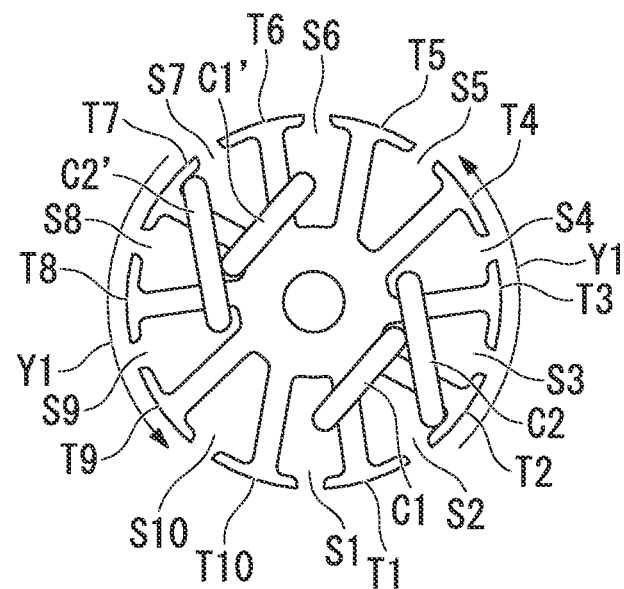
FIG. 18B is a view describing the winding process of the winding according to the fourth embodiment.

Next, as shown in FIGS. 18B and 19, the winding start end 243a of the winding 243 is hooked around the riser 269 of the second segment 268, the second segment 268 is connected to the winding 243, and then the winding 243 is pulled into the second slot S2. Then, the winding 243 is wound n times between the second slot S2 and the fourth slot S4 to form a second coil C2.

After that, the winding stop end 243b of the second coil C2 is pulled into the seventh slot S7. Then, the winding 243 is wound n times between the seventh slot S7 and the ninth slot S9 to form a No. 2' coil C2'. Further, the winding stop end 243b of the No. 2' coil C2' is hooked around the riser 269 of the eighth segment 268 having the same electric potential as the third segment 268 adjacent to the second segment 268, and connects the eighth segment 268 and the winding 243. Accordingly, a winding process of the second coil C2 and the No. 2' coil C2' is terminated.

Here, the first coil C1, which is previously formed, pulls in the second slot S2, into which the winding 243 of the second coil C2 is pulled. For this reason, in the second slot S2, the second coil C2 is formed outside in the radial direction of the first coil C1. Meanwhile, in the fourth slot S4, the second coil C2 is formed furthest inside in the radial direction. In addition, the No. 2' coil C2' is also similar to the No. 1' coil C1'.

Figure 18C:
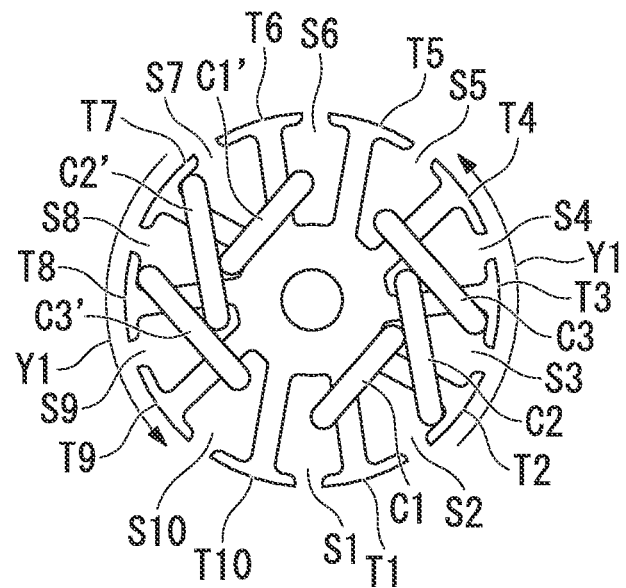
FIG. 18C is a view describing the winding process of the winding according to the fourth embodiment.

Next, as shown in FIGS. 18C and 19, the winding start end 243a of the winding 243 is hooked around the riser 269 of the third segment 268, the third segment 268 is connected to the winding 243, and then the winding 243 is pulled into the third slot S3. Then, the winding 243 is wound n times between the third slot S3 and the fifth slot S5 to form a third coil C3.

After that, the winding stop end 243b of the third coil C3 is pulled into the eighth slot S8. Then, the winding 243 is wound n times between the eighth slot S8 and the tenth slot S10 to form a No. 3' coil C3'. Further, the winding stop end 243b of the No. 3' coil C3' is wound around the riser 269 of the ninth segment 268 having the same electric potential as the fourth segment 268 adjacent to the third segment 268, and connects the ninth segment 268 and the winding 243. Accordingly, a winding process of the third coil C3 and the No. 3' coil C3' is terminated.

Here, the first coil C1, which is previously formed, is pulled into the third slot S3, into which the winding 243 of the third coil C3 is pulled, and the second coil C2 is wound around therein. For this reason, in the third slot S3, the third coil C3 is formed to be disposed furthest outside in the radial direction of the armature core 261. Meanwhile, in the fifth slot S5, the third coil C3 is disposed furthest inside in the radial direction. In addition, the No. 3' coil C3' is also similar to the No. 1' coil C1' and the No. 2' coil C2'.

Figure 18D:
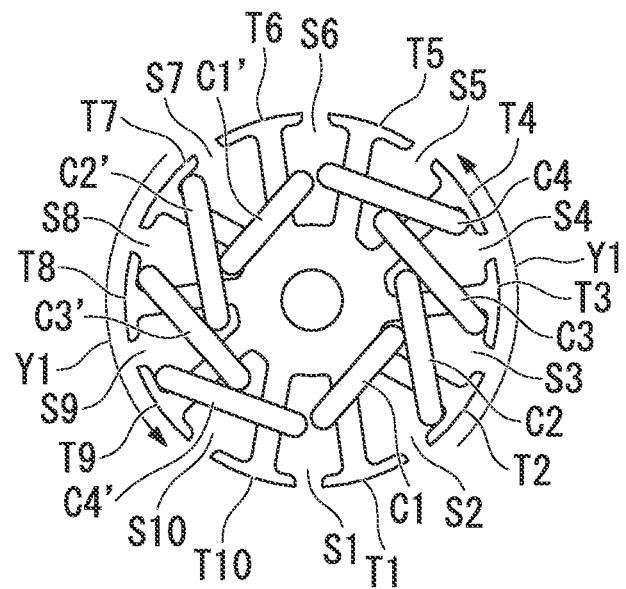
FIG. 18D is a view describing the winding process of the winding according to the fourth embodiment.

Next, as shown in FIGS. 18D and 19, the winding start end 243a of the winding 243 is hooked around the riser 269 of the fourth segment 268, the fourth segment 268 is connected to the winding 243, and then the winding 243 is pulled into the fourth slot S4. Then, the winding 243 is wound n times between the fourth slot S4 and the sixth slot S6 to form a fourth coil C4.

After that, the winding stop end 243b of the fourth coil C4 is pulled into the ninth slot S9. Then, the winding 243 is wound n times between the ninth slot S9 and the first slot S1 to form a No. 4' coil C4'. Further, the winding stop end 243b of the No. 4' coil C4' is hooked around the riser 269 of the tenth segment 268 having the same electric potential as the fifth segment 268 adjacent to the fourth segment 268, and connects the tenth segment 268 and the winding 243. Accordingly, a winding process of the fourth coil C4 and the No. 4' coil C4' is terminated.

Here, the second coil C2, which is previously formed, is pulled into the fourth slot S4, into which the winding 243 of the fourth coil C4 is pulled, and the third coil C3 is wound around therein. For this reason, in the fourth slot S4, the fourth coil C4 is formed to be disposed furthest outside in the radial direction of the armature core 261. Meanwhile, in the sixth slot S6, the fourth coil C4 is disposed furthest inside in the radial direction. In addition, the No. 4' coil C4' is also similar to the No. 2' coil C2' and the No. 3' coil C3'.

Figure 18E:
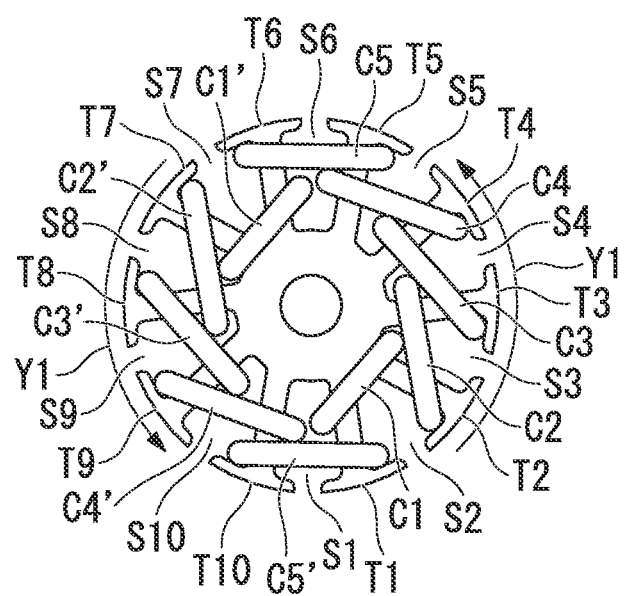
FIG. 18E is a view describing the winding process of the winding according to the fourth embodiment.

Next, as shown in FIGS. 18E and 19, the winding start end 243a of the winding 243 is hooked around the riser 269 of the fifth segment 268, the fifth segment 268 is connected to the winding 243, and then the winding 243 is pulled into the fifth slot S5. Then, the winding 243 is wound n times between the fifth slot S5 and the seventh slot S7 to form a fifth coil C5.

After that, the winding stop end 243b of the fifth coil C5 is pulled into the tenth slot S10. Then, the winding 243 is wound n times between the tenth slot S10 and the second slot S2 to form a No. 5' coil C5'. Further, the winding stop end 243b of the No. 5' coil C5' is hooked around the riser 269 of the first segment 268 having the same electric potential as the sixth segment 268 adjacent to the fifth segment 268, and connects the first segment 268 and the winding 243. Accordingly, a winding process of the fifth coil C5 and the No. 5' coil C5' is terminated.

In this way, the armature coil 262 is formed on the armature core 261 through the winding process of sequentially forming the coils C1 to C5' in the winding direction Y1.

Here, the third coil C3, which is previously formed, is pulled into the fifth slot S5, into which the winding 243 of the fifth coil C5 is pulled, and the fourth coil C4 is wound around therein. For this reason, in the fifth slot S5, the fifth coil C5 is formed furthest outside in the radial direction of the armature core 261. Meanwhile, the No. 1' coil C1', which is previously formed, is pulled into the seventh slot S7. For this reason, in the seventh slot S7, the fifth coil C5 is formed outside in the radial direction of the No. 1' coil C1'.

Accordingly, according to the fourth embodiment, as the armature core 261 is formed as a deformed core shown in FIG. 17, since an unnecessary gap is not formed between the coils C1 to C5' sequentially formed in the winding direction Y1, generation of an ineffective space in the slots S1 to S10 can be suppressed. For this reason, a space factor of the armature coil 262 can be improved, and the coil can be distributed in the slots S1 to S10 with better balance. As a result, reduction in size and weight of the electric motor 201 can be achieved.

In addition, while the armature core 261 is formed as the deformed core, since the teeth T1 to T10 are constituted by the two tooth groups 251 and 252 alternately disposed to be point-symmetrical to each other, occurrence of rotation imbalance of the armature 206 can be prevented.

Further, the circumferential wall 281 of the yoke 208 is constituted by a pair of flat sections 281a disposed to oppose each other about the rotary shaft 212, and arc-shaped sections 281b connecting end sections in the circumferential direction of the pair of flat sections 281a. For this reason, in comparison with the case in which the circumferential wall 281 of the yoke 208 is formed in a cylindrical shape, the yoke 208 can be flattened. Accordingly, the entire electric motor 201 can be flattened, and a degree of freedom of layout of the electric motor 201 can be increased.

Here, it is also considered that, in order to further reduce the size of the yoke 208, the four flat sections 281a are disposed in the circumferential direction of the circumferential wall 281 at 90° intervals, end sections in the circumferential direction of the flat sections 281a are formed to be connected by the arc-shaped sections 281b, and the four permanent magnets 214 are formed at inner surfaces of the arc-shaped sections 281b distant from the flat sections 281a.

However, in the case of the above-mentioned configuration, four places having a short distance are formed between the circumferential wall 281 of the yoke 208 and the outer circumferential section of the armature core 261. That is, in the circumferential wall 281, a distance between the flat section 281a and the outer circumferential section of the armature core 261 is smaller than a distance between the arc-shaped section 281b and the outer circumferential section of the armature core 261. For this reason, when the four flat sections 281a are formed, places having a short distance between the circumferential wall 281 of the yoke 208 and the outer circumferential section of the armature core 261 are accordingly increased by two in comparison with when the two flat sections 281a are formed.

Here, in the places having a short distance between the circumferential wall 281 of the yoke 208 and the outer circumferential section of the armature core 261, a reluctance is increased, and a cogging torque when the armature 206 is rotated is increased. For this reason, like in the above-mentioned fourth embodiment, as the number of flat section 281a formed at the circumferential wall 281 is set to two disposed to oppose each other about the rotary shaft 212, deterioration of motor characteristics can be suppressed while flattening the yoke 208.

Further, in the fourth embodiment, the case in which the winding start end 243a and the winding stop end 243b of the armature coil 262 (the coils C1 to C5') wound on the armature core 261 is pulled around a region R1 surrounded by a broken line of FIG. 19 has been described. However, the present invention is not limited to the case shown in FIG. 19 but the coils C1 to C5' may be connected to the segments 268 having a predetermined electrical potential.

In addition, in the fourth embodiment, the case in which the first coil C1 and the No. 1' coil C1' are wound in series, the second coil C2 and the No. 2' coil C2' are wound in series, the third coil C3 and the No. 3' coil C3' are wound in series, the fourth coil C4 and the No. 4' coil C4' are wound in series, and the fifth coil C5 and the No. 5' coil C5' are wound in series to form the armature coil 262 has been described. However, the present invention is not limited thereto but the armature coil 262 may be formed as described below.

(First Modified Example of Fourth Embodiment)

Figure 20:
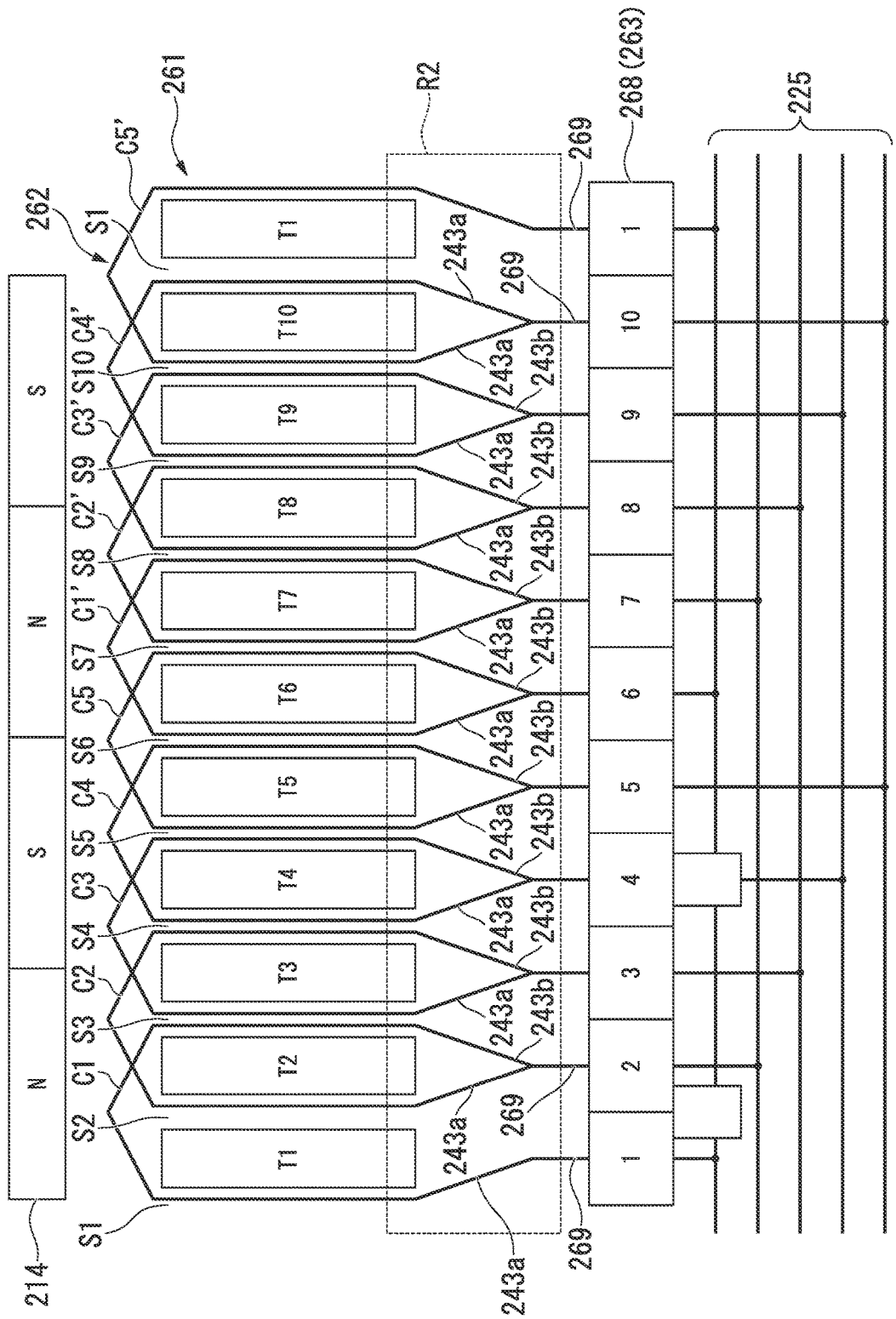
FIG. 20 is a development view of an armature according to a first modified example of the fourth embodiment.

FIG. 20 is a development view of an armature according to a first modified example of the fourth embodiment.

As shown in FIG. 20, the first to fifth coils C1 to C5 and the No. 1' to No. 5' coils C1' to C5' are alternately connected to each other in parallel.

That is, while the winding start end 243a of the winding 243 forming the first coil C1 is connected to the first segment 268, the winding stop end 243b is connected to the second segment 268.

In addition, while the winding start end 243a of the winding 243 forming the second coil C2 is connected to the second segment 268, the winding stop end 243b is connected to the third segment 268.

Further, while the winding start end 243a of the winding 243 forming the third coil C3 is connected to the third segment 268, the winding stop end 243b is connected to the fourth segment 268.

Then, while the winding start end 243a of the winding 243 forming the fourth coil C4 is connected to the fourth segment 268, the winding stop end 243b is connected to the fifth segment 268.

In addition, while the winding start end 243a of the winding 243 forming the fifth coil C5 is connected to the fifth segment 268, the winding stop end 243b is connected to the sixth segment 268.

On the other hand, the winding 243 forming the No. 1' coil C1' is connected to the sixth segment 268 and the seventh segment 268 having the same electric potential as the first segment 268 and the second segment 268, the winding 243 forming the No. 2' coil C2' is connected to the seventh segment 268 and the eighth segment 268 having the same electric potential as the second segment 268 and the third segment 268, the winding 243 forming the No. 3' coil C3' is connected to the eighth segment 268 and the ninth segment 268 having the same electric potential as the third segment 268 and the fourth segment 268, the winding 243 forming the No. 4' coil C4' is connected to the ninth segment 268 and the tenth segment 268 having the same electric potential as the fourth segment 268 and the fifth segment 268, and the winding 243 forming the No. 5' coil C5' is connected to the tenth segment 268 and the first segment 268 having the same electric potential as the fifth segment 268 and the sixth segment 268.

As the winding method of the first coil C1 to the No. 5' coil C5' formed in this way, a method of sequentially winding the first coil C1 and the No. 1' coil C1' and sequentially winding the second coil C2 to the No. 5' coil C5' similarly thereto may be employed.

Alternatively, a so-called double flyer type winding method of simultaneously winding the first coil C1 and the No. 1' coil C1' disposed to oppose each other about the rotary shaft 212, and simultaneously winding the second coil C2 and the No. 2' coil C2', the third coil C3 and the No. 3' coil C3', the fourth coil C4 and the No. 4' coil C4', and the fifth coil C5 and the No. 5' coil C5' may be employed.

Accordingly, according to the first modified example of the fourth embodiment, in addition to the same effects as in the fourth embodiment, since the number of parallel circuits is two times more than in the winding method of FIG. 19, a wire diameter of the winding 243 can be reduced to that extent. For example, the winding operation of the winding 243 can be facilitated.

Further, in the first modified example, the case in which the winding start end 243a and the winding stop end 243b of the armature coil 262 (the coils C1 to C5') wound on the armature core 261 are pulled into a region R2 surrounded by a broken line of FIG. 20 has been described. However, the present invention is not limited to the case shown in FIG. 20 but the winding start end 243a and the winding stop end 243b of each of the coils C1 to C5' may be connected to the segments 268 having a predetermined electric potential.

Fifth Embodiment (Electric Motor)

Next, a fifth embodiment of the present invention will be described with reference to FIGS. 21 and 22.

Figure 21:
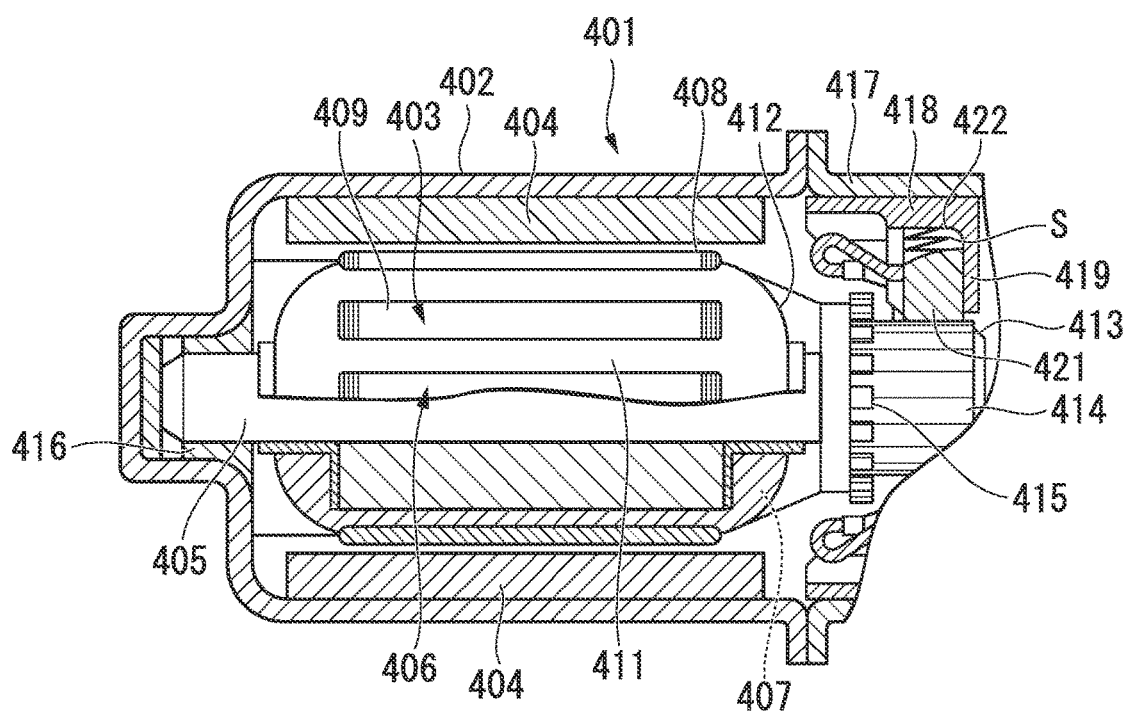
FIG. 21 is a longitudinal cross-sectional view of an electric motor according to a fifth embodiment.

FIG. 21 is a longitudinal cross-sectional view of an electric motor.

As shown in FIG. 21, an electric motor 401 is a driving source of electric components mounted on a vehicle, and is configured by rotatably disposing an armature 403 in a bottomed cylindrical yoke 402. Four permanent magnets 404 are disposed at an inner circumferential surface of the yoke 402 such that magnetic poles are sequentially disposed in a circumferential direction. Accordingly, the electric motor 401 is in a state in which four magnetic poles are formed in the yoke 402.

The armature 403 is constituted by an armature core 406 fitted and fixed onto a rotary shaft 405, an armature coil 407 wound on the armature core 406, and a commutator 413 disposed at one end side of the armature core 406. The armature core 406 is formed by stacking a plurality of ring-shaped metal plates 408 in the axial direction. Ten teeth 409 each formed in a T shape when seen from a plan view in the axial direction are formed at an outer circumferential section of the metal plate 408 in the circumferential direction at equal intervals.

As the plurality of metal plates 408 are fitted onto the rotary shaft 405, a dovetail-groove-shaped slot 411 is formed at the outer circumference of the armature core 406 between the neighboring teeth 409. The ten slots 411 extend in the axial direction and are formed in the circumferential direction at equal intervals.

A winding 412 coated with enamel is wound between the slots 411, and thus the plurality of armature coils 407 are formed at the outer circumference of the armature core 406.

The commutator 413 is fitted and fixed onto one end of the rotary shaft 405. Ten segments 414 formed of a conductive material are attached to an outer circumferential surface of the commutator 413. The segments 414 are formed of a plate-shaped metal piece elongated in the axial direction, and fixed in parallel in the circumferential direction at equal intervals while being insulated from each other. A riser 415 bent to return to the outer diameter side is integrally formed with an end section of each of the segments 414 near the armature core 406. A winding start end 431 and a winding stop end 432 (see FIG. 22) of the winding 412 forming the armature coil 407 or a connecting wire 425 (to be described below) are hooked around the riser 415, and fixed to the riser 415 by fusing. Accordingly, the segment 414 is electrically connected to the armature coil 407 and the connecting wire 425 corresponding thereto.

The other end side of the rotary shaft 405 is rotatably supported by a bearing 416 in a boss protruding from the yoke 402. A cover 417 is installed at an opening end of the yoke 402, and a holder stay 418 is attached to an inner side of the cover 417. Two brush holders 419 are installed at the holder stay 418 at an interval of a predetermined angle (in the fifth embodiment, 90 degrees) in the circumferential direction.

A brush 421 is installed in each of the brush holders 419 to be protrudable or withdrawable while being biased via a spring S. The distal end sections of the brushes 421 come in contact with the commutator 413 due to biasing by the spring S, and are configured such that power from the outside is supplied to the commutator 413 via the brush 421.

(Winding Method of Winding)

Figure 22:
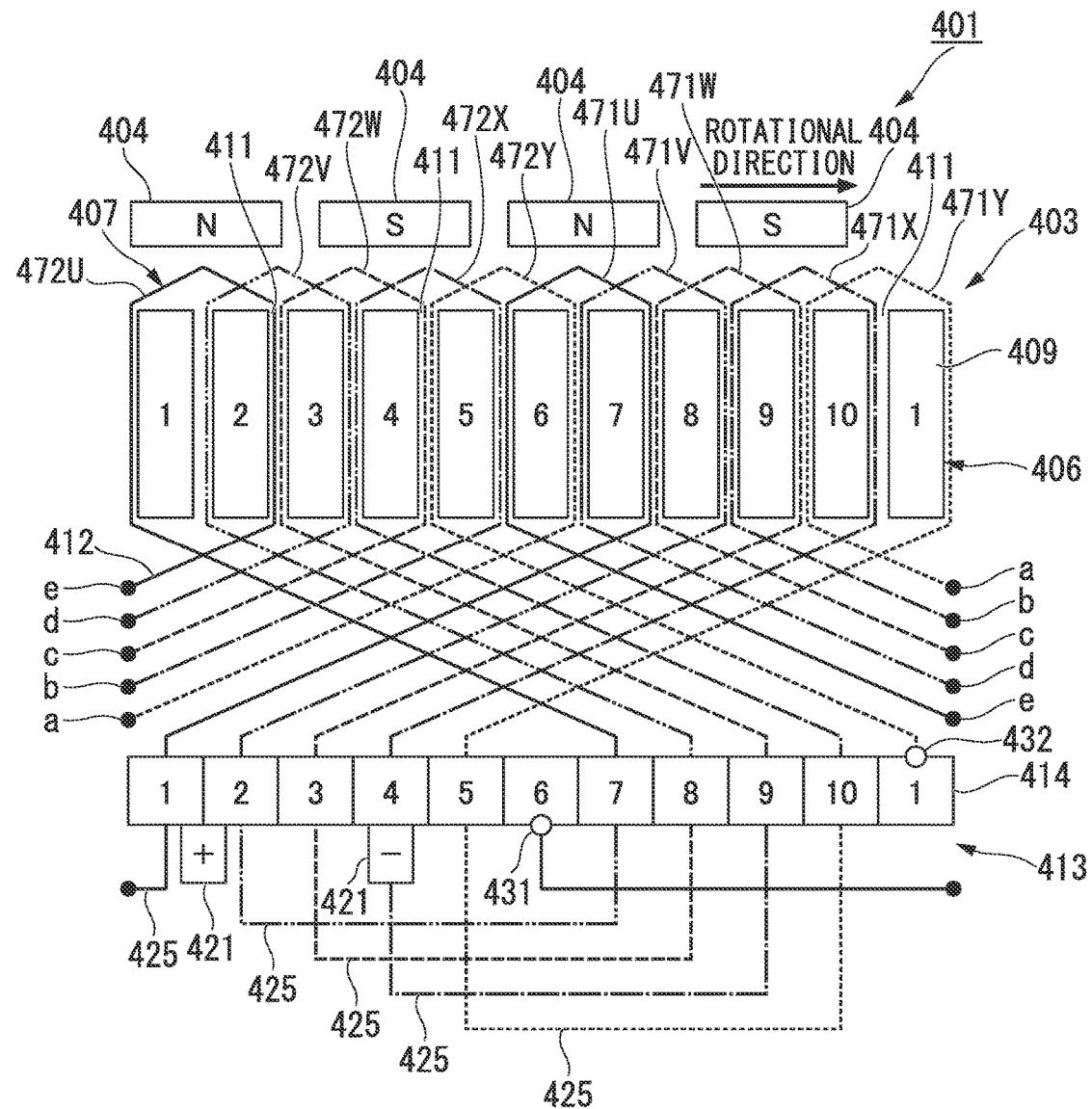
FIG. 22 is a development view of an armature according to the fifth embodiment.

FIG. 22 is a development view of the segments 414 (the riser 415) and the teeth 409 of the armature 403, and the permanent magnets 404 disposed at the yoke 402 side, and gaps between the neighboring teeth 409 correspond to the slots 411 (the same for the remaining drawings). Further, in the description of the following drawings, reference numerals are sequentially designated to the segments 414 and the teeth 409 in a rotational direction, and reference numerals are designated to the winding 412 wound thereon. In addition, in FIG. 22, a rotational direction of the armature 403 (hereinafter, simply referred to as a rotational direction) is a rightward direction.

Here, the armature coil 407 formed at the outer circumference of the armature core 406 is formed by winding the winding 412 through the distributed winding method to straddle the two neighboring teeth 409 and 409, forming a 5-phase structure of a U phase, a V phase, a W phase, an X phase and a Y phase. Then, the armature coils 407 of each phase are formed at two places to oppose each other about the rotary shaft 405. That is, the armature coil 407 is constituted by a first U phase coil 471U, a second U phase coil 4720, a first V phase coil 471V, a second V phase coil 472V, a first W phase coil 471W, a second W phase coil 472W, a first X phase coil 471X, a second X phase coil 472X, a first Y phase coil 471Y, and a second Y phase coil 472Y.

In addition, the segments 414 having the same electric potential, i.e., the two segments 414 opposing each other about the rotary shaft 405, are short-circuited by the connecting wire 425.

The armature coil 407 and the connecting wire 425 having the above-mentioned configuration are formed by serially pulling the windings 412 to each other. This will be described in detail below.

As shown in FIG. 22, first, for example, when the winding start end 431 of the winding 412 is hooked around the riser 415 of the sixth segment 414, the winding 412 is subsequently hooked around the riser 415 of the first segment 414 having the same electric potential as the sixth segment 414. Then, the connecting wire 425 configured to short-circuit the sixth segment 414 and the first segment 414 is formed.

Next, the winding 412 is pulled into the slot 411 between the seventh and eighth teeth 409 and 409 at positions substantially opposite to the first segment 414 about the rotary shaft 405. Then, the winding 412 is wound N times (N is a natural number) between the slot 411 between the seventh and eighth teeth 409 and 409 and the slot 411 between the fifth and sixth teeth 409 and 409 skipping every other slot 411 at an opposite side in the rotational direction, forming the first U phase coil 471U.

The winding 412 forming the first U phase coil 471U is pulled from the slot 411 between the fifth and sixth teeth 409 and 409 and routed in the rotational direction, and then pulled into the slot 411 between the second and third teeth 409 and 409. Then, the winding 412 is wound N times between the slot 411 between the second and third teeth 409 and 409 and the slot 411 between the tenth and first teeth 409 and 409 skipping every other slot 411 at an opposite side in the rotational direction, forming the second U phase coil 472U.

Next, the winding 412 is pulled from the slot 411 between the tenth and first teeth 409 and 409 and hooked around the riser 415 of the seventh segment 414 substantially opposite to the slot 411 about the rotary shaft 405 and adjacent to the sixth segment 414. Further, the winding 412 is hooked around the riser 415 of the second segment 414 having the same electric potential as the seventh segment 414. Accordingly, the connecting wire 425 configured to short-circuit the seventh segment 414 and the second segment 414 is formed.

Next, the winding 412 is pulled into the slot 411 between the eighth and ninth teeth 409 and 409 substantially opposite to the second segment 414 about the rotary shaft 405, and the winding 412 is wound N times between the slot 411 between the eighth and ninth teeth 409 and 409 and the slot 411 between the sixth and seventh teeth 409 and 409 skipping every other slot 411 at an opposite side in the rotational direction, forming the first V phase coil 471V.

The winding 412 forming the first V phase coil 471V is pulled from the slot 411 between the sixth and seventh teeth 409 and 409, routed in the rotational direction, and then pulled into the slot 411 between the third and fourth teeth 409 and 409. Then, the winding 412 is wound N times between the slot 411 between the third and fourth teeth 409 and 409 and the slot 411 between the first and second teeth 409 and 409 skipping every other slot 411 at an opposite side in the rotational direction, forming the second V phase coil 472V.

Next, the winding 412 is pulled from the slot 411 between the first and second teeth 409 and 409 and hooked around the riser 415 of the eighth segment 414 substantially opposite to the slot 411 about the rotary shaft 405 and adjacent to the seventh segment 414. Further, the winding 412 is hooked around the riser 415 of the third segment 414 having the same electric potential as the eighth segment 414.

Accordingly, the connecting wire 425 configured to short-circuit the eighth segment 414 and the third segment 414 is formed.

After that, in the same sequence as when the first U phase coil 471U to the second V phase coil 472V are formed, the first W phase coil 471W is formed between the slot 411 between the ninth and tenth teeth 409 and 409 and the slot 411 between the seventh and eighth teeth 409 and 409, and the second W phase coil 472W is formed between the slot 411 between the fourth and fifth teeth 409 and 409 and the slot 411 between the second and third teeth 409 and 409.

Further, the winding 412 is hooked again around the riser 415 of the corresponding segment 414, and then the winding 412 is hooked around the segment 414 having the same electric potential. Then, the connecting wire 425 configured to short-circuit the segments 414 having the same electric potential is formed. After that, the winding 412 is pulled toward the armature core 406 again, and the first X phase coil 471X and the second X phase coil 472X are formed between the predetermined slots 411.

Next, the winding 412 is hooked again around the riser 415 of the corresponding segment 414, and further, the winding 412 is hooked around the segment 414 having the same electric potential to form the connecting wire 425. Then, the winding 412 is pulled again toward the armature core 406, and the first Y phase coil 471Y and the second Y phase coil 472Y are formed between the predetermined slots 411. After a second Y phase coil 472 is formed, the winding stop end 432 of the winding 412 is hooked around and connected to the riser 415 of the first segment 414. Accordingly, formation of the armature coil 407 wound the armature core 406 is terminated.

In this way, as the winding 412 is routed such that a space between the segment 414 and the armature core 406 is repeatedly moved with a single stroke, the armature coil 407 and the connecting wire 425 are formed in series.

In addition, when the winding 412 is routed from the segment 414 toward the armature core 406, the riser 415 of the segment 414 from which the winding 412 is pulled and the slot 411 into which the winding 412 is pulled are disposed to be substantially opposing each other about the rotary shaft 405. Similarly, when the winding 412 is routed from the armature core 406 toward the segment 414, the slot 411 from which the winding 412 is pulled and the riser 415 of the segment 414 around which the winding 412 is hooked are disposed to be substantially opposing each other about the rotary shaft 405. For this reason, the winding 412 routed between the commutator 413 and the armature core 406, i.e., the winding 412 routed under the commutator 413, is slightly hooked by the rotary shaft 405.

According to the above-mentioned configuration, when current is sequentially supplied to the coils 471U to 472Y via the brush 421, magnetic fields are sequentially generated at predetermined positions of the armature core 406. Then, a repulsive force or an attractive force is generated between the permanent magnets 404 installed at the yoke 402, and the armature 403 is rotated.

(Effects)

Accordingly, according to the fifth embodiment, as the winding 412 is routed to be repeatedly moved with one stroke when the armature coil 407 and the connecting wire 425 are formed, since the armature coil 407 and the connecting wire 425 can be formed in series, a total time of a winding time of the winding 412 on the armature core 406 and a formation time of the connecting wire 425 crossing between the segments 414 can be reduced. As a result, manufacturing cost of the electric motor 401 can be reduced.

In addition, since the winding 412 routed under the commutator 413 is slightly hooked by the rotary shaft 405, it is possible to prevent the winding 412 under the commutator 413 from being loosened outward in the radial direction. For this reason, it is possible to reduce thickening of the winding 412 under the commutator 413.

Sixth Embodiment

Next, a sixth embodiment of the present invention will be described with reference to FIG. 23 along with FIG. 21.

Figure 23:
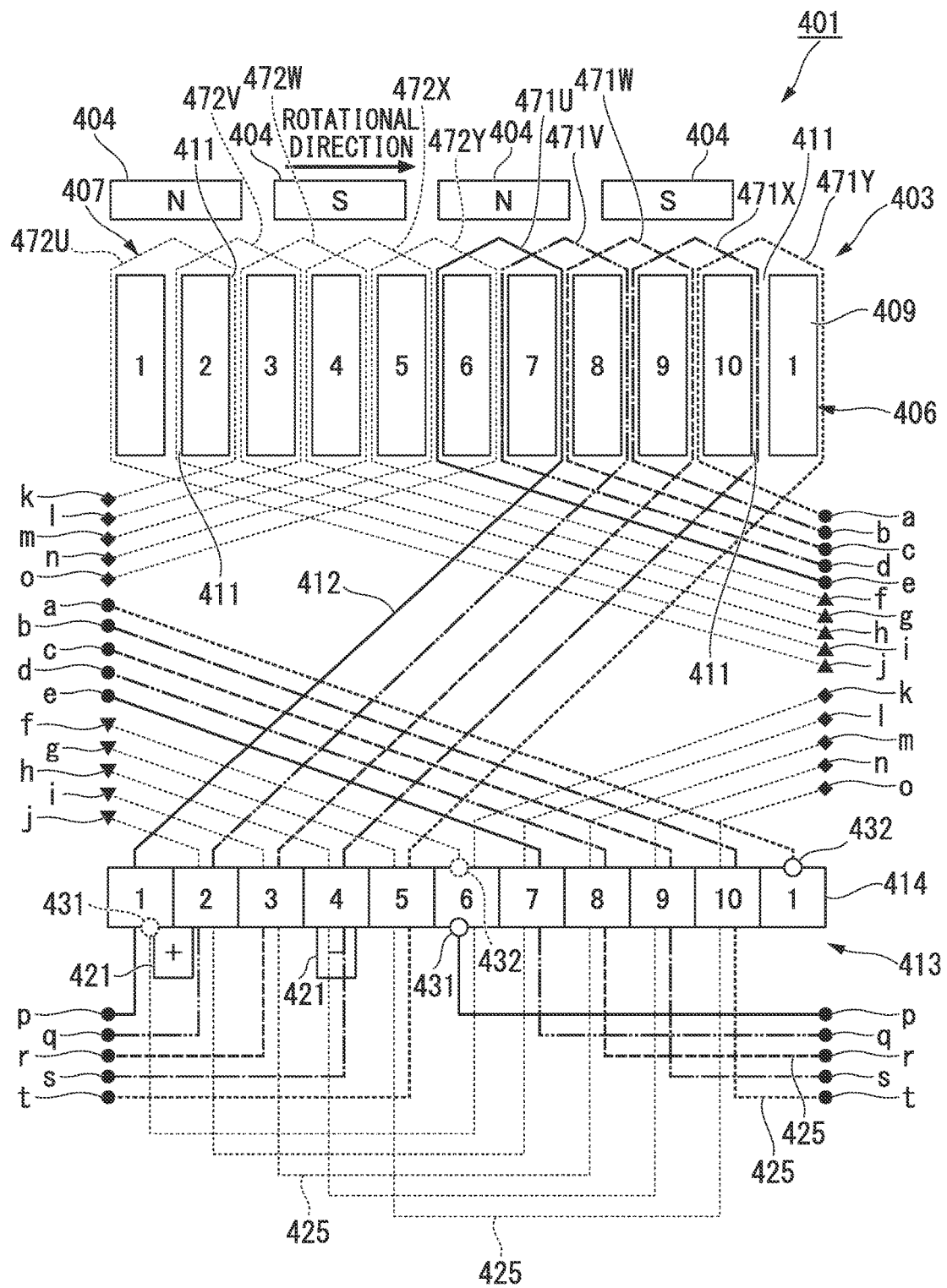
FIG. 23 is a development view of an armature according to a sixth embodiment.

FIG. 23 is a development view of the segment 414 (the riser 415) and the teeth 409 of the armature 403 according to the sixth embodiment, and the permanent magnets 404 disposed at the yoke 402 side. Further, in the following description, the same reference numerals are designated to the same components as in the fifth embodiment (the same hereinafter).

Basic configurations of the sixth embodiment are similar to those of the fifth embodiment (the same hereinafter) in that the electric motor 401 is a motor in which the number of permanent magnets 404 is four, the number of slots 411 is ten and the number of segments 414 is ten, the armature coil 407 formed at the outer circumference of the armature core 406 is formed by winding the winding 412 through the distributed winding method to straddle the two neighboring teeth 409 and 409 and form a 5-phase structure of a U phase, a V phase, a W phase, an X phase and a Y phase, the armature coils 407 of each phase are formed at two places to be opposing each other about the rotary shaft 405, the segments 414 having the same electric potential, i.e., the two segments 414 opposing each other about the rotary shaft 405, are short-circuited by the connecting wire 425, and so on.

Here, the armature coil 407 wound on the armature core 406 of the sixth embodiment and the connecting wire 425 connected between the segments 414 having the same electric potential are formed by winding the winding 412 through a so-called double flyer method. Further, the double flyer method is a method of simultaneously winding the winding 412 at two places with a relationship of point symmetry about the rotary shaft 405. Hereinafter, this will be described in detail.

(Winding Method of Winding)

As shown in FIG. 23, there are two winding start ends 431 of the winding 412, which are hooked around the riser 415 of the sixth segment 414 and the riser 415 of the first segment 414 having the same electric potential. Then, the winding 412 having the winding start end 431 hooked around the riser 415 of the sixth segment 414 forms the first U phase coil 471U, the first V phase coil 471V, the first W phase coil 471W, the first X phase coil 471X and the first Y phase coil 471Y, and the connecting wire 425 connected to the segments 414 corresponding to the coils 471U to 471Y in series.

In addition, the winding 412 having the winding start end 431 hooked around the riser 415 of the first segment 414 forms the second U phase coil 472U, the second V phase coil 472V, the second W phase coil 472W, the second X phase coil 472X and the second Y phase coil 472Y, and the connecting wire 425 connected to the segment 414 corresponding to the coils 472U to 472Y in series. Then, the connecting wire 425 connected to the first U phase coil 471U, the first V phase coil 471V, the first W phase coil 471W, the first X phase coil 471X, the first Y phase coil 471Y, and the segments 414 corresponding to the coils 471U to 471Y, and the connecting wire 425 connected to the second U phase coil 472U, the second V phase coil 472V, the second W phase coil 472W, the second X phase coil 472X, the second Y phase coil 472Y, and the segments 414 corresponding to the coils 472U to 472Y are simultaneously formed.

Here, a winding method of the winding 412 having the winding start end 431 hooked around the riser 415 of the sixth segment 414 will be described in detail.

First, after the winding start end 431 of the winding 412 is hooked around the riser 415 of the sixth segment 414, the winding 412 is hooked around the riser 415 of the first segment 414 having the same electric potential as the sixth segment 414. Then, the connecting wire 425 configured to short-circuit the sixth segment 414 and the first segment 414 is formed.

Next, the winding 412 is pulled into the slot 411 between the seventh and eighth teeth 409 and 409 at substantially opposite positions of the first segment 414 about the rotary shaft 405. Then, the winding 412 is wound N times between the slot 411 between the seventh and eighth teeth 409 and 409 and the slot 411 between the fifth and sixth teeth 409 and 409 skipping every other slot 411 at an opposite side in the rotational direction, forming the first U phase coil 471U.

The winding 412 forming the first U phase coil 471U is pulled from the slot 411 between the fifth and sixth teeth 409 and 409, routed in the rotational direction, and then hooked around the riser 415 of the seventh segment 414 adjacent to the sixth segment 414. Further, the winding 412 is hooked around the riser 415 of the second segment 414 having the same electric potential as the seventh segment 414. Accordingly, the connecting wire 425 configured to short-circuit the seventh segment 414 and the second segment 414 is formed.

Next, the winding 412 is pulled into the slot 411 between the eighth and ninth teeth 409 and 409 at positions substantially opposite to the second segment 414 about the rotary shaft 405, and the winding 412 is wound N times between the slot 411 between the eighth and ninth teeth 409 and 409 and the slot 411 between the sixth and seventh teeth 409 and 409 by skipping every other slot 411 at an opposite side in the rotational direction, forming the first V phase coil 471V.

The winding 412 forming the first V phase coil 471V is pulled from the slot 411 between the sixth and seventh teeth 409 and 409, routed in the rotational direction, and then hooked around the riser 415 of the eighth segment 414 adjacent to the seventh segment 414. Further, the winding 412 is hooked around the riser 415 of the third segment 414 having the same electric potential as the eighth segment 414. Accordingly, the connecting wire 425 configured to short-circuit the eighth segment 414 and the third segment 414 is formed.

After that, in the same sequence as when the first U phase coil 471U and the first V phase coil 471V are formed, a first W phase coil 71W is formed between the slot 411 between the ninth and tenth teeth 409 and 409 and the slot 411 between the seventh and eighth teeth 409 and 409. Further, the winding 412 is wound again around the riser 415 of the corresponding segment 414, and then the winding 412 is wound around the segment 414 having the same electric potential. Then, the connecting wire 425 configured to short-circuit the segments 414 having the same electric potential is formed. After that, the winding 412 is pulled again at the armature core 406 side, and the first X phase coil 471X is formed between the predetermined slots 411.

Next, the winding 412 is hooked again around the riser 415 of the corresponding segment 414, and the connecting wire 425 on which the winding 412 is wound around the segment 414 having the same electric potential is further formed. Then, the winding 412 is pulled again at the armature core 406 side, the first Y phase coil 471Y is formed between the predetermined slots 411, and then the winding stop end 432 of the winding 412 is wound around and connected to the riser 415 of the first segment 414.

In this way, in the armature coil 407 wound on the armature core 406, the first U phase coil 471U, the first V phase coil 471V, the first W phase coil 471W, the first X phase coil 471X, the first Y phase coil 471Y, and the connecting wire 425 connected to the segments 414 corresponding to the coils 471U to 471Y are formed.

Meanwhile, the winding 412 having the winding start end 431 hooked around the riser 415 of the first segment 414 is routed to be point-symmetrical to the winding method of the winding 412 having the winding start end 431 hooked around the riser 415 of the sixth segment 414, and in the armature coil 407, forms the second U phase coil 472U, the second V phase coil 472V, the second W phase coil 472W, the second X phase coil 472X, the second Y phase coil 472Y, and the connecting wire 425 connected to the segments 414 corresponding to the coils 472U to 472Y Accordingly, formation of the entire armature coil 407 wound on the armature core 406 is terminated.

(Effects)

Accordingly, according to the sixth embodiment, as a winding method in the distributed winding method of the winding 412 on the armature core 406, a so-called double flyer method of simultaneously winding the winding 412 at two places with a relationship of point symmetry about the rotary shaft 405 may be employed. For this reason, a total time of a winding time of the winding 412 on the armature core 406 and a formation time of the connecting wire 425 crossing the segments 414 can be reduced. As a result, manufacturing cost of the electric motor 401 can be further reduced.

Seventh Embodiment (Winding Method of Winding)

Next, a seventh embodiment of the present invention will be described with reference to FIG. 24.

Figure 24:
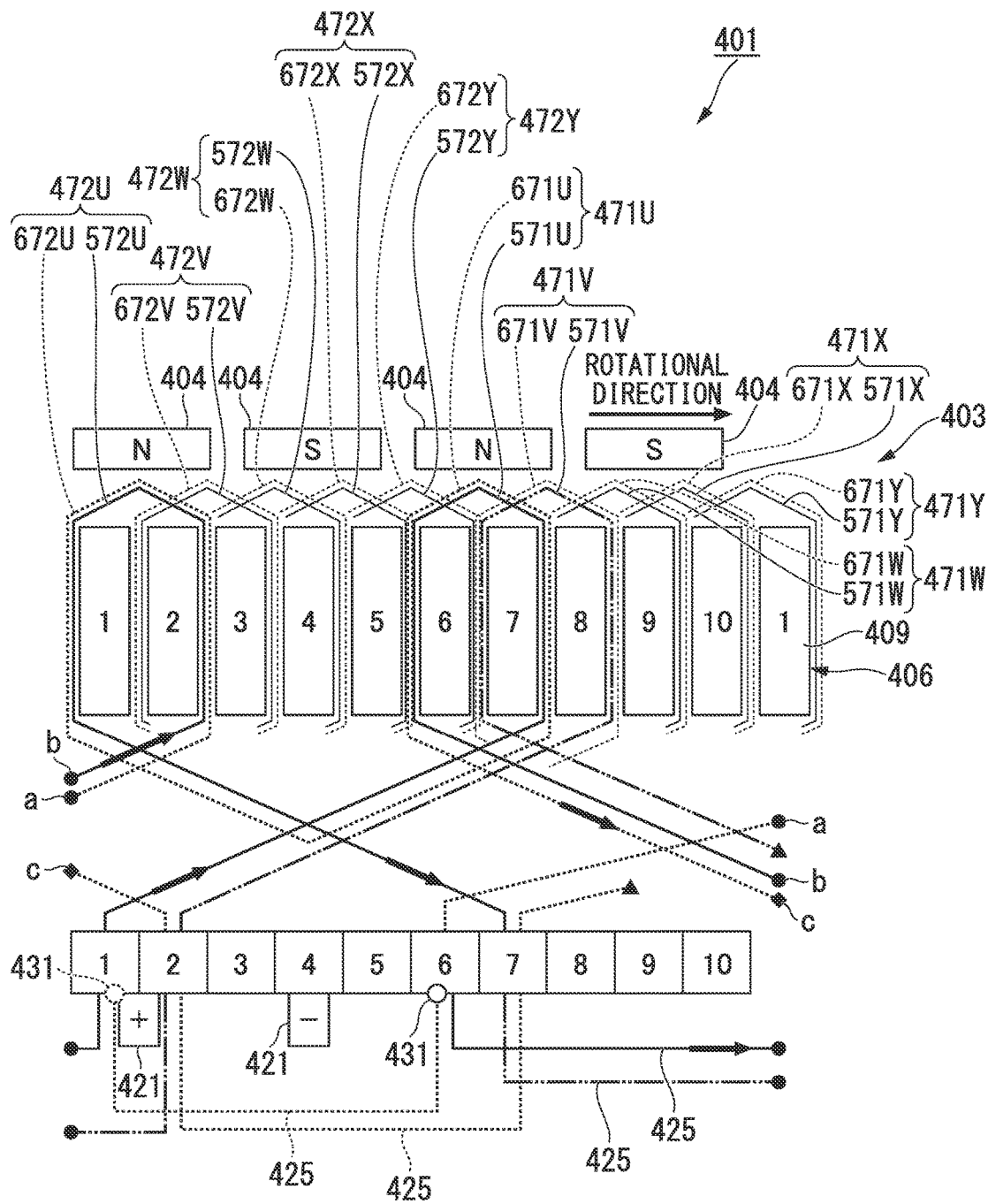
FIG. 24 is a development view of an armature according to a seventh embodiment.

FIG. 24 is a development view of the segment 414 (the riser 415) and the teeth 409 of the armature 403 according to the seventh embodiment and the permanent magnets 404 disposed at the yoke 402 side.

As shown in FIG. 24, the winding method of the winding 412 of the fifth embodiment is distinguished from the winding method of the winding 412 of the seventh embodiment in that, while each of the phase coils 471U to 472Y of the fifth embodiment is formed by winding the winding 412 N times at once, each of the phase coils 471U to 472Y of the seventh embodiment is constituted by two small coils 571U to 672Y wound N/2 times.

This will be described in detail.

Here, as shown in FIG. 24, there are two winding start ends 431 of the winding 412 as in the sixth embodiment. In the two winding start ends 431 and 431, for example, when one of the winding start ends 431 is hooked around the riser 415 of the sixth segment 414, the winding 412 is hooked around the riser 415 of the first segment 414 having the same electric potential as the sixth segment 414. Then, the connecting wire 425 configured to short-circuit the sixth segment 414 and the first segment 414 is formed.

Next, the winding 412 is pulled into the slot 411 between the seventh and eighth teeth 409 and 409, and the winding 412 is wound N/2 times between the slot 411 between the seventh and eighth teeth 409 and 409 and the slot 411 between the fifth and sixth teeth 409 and 409 to form a first U phase small coil 571U.

The winding 412 forming the first U phase small coil 571U is pulled from the slot 411 between the fifth and sixth teeth 409 and 409, routed in the rotational direction, and pulled into the slot 411 between the second and third teeth 409 and 409. Then, the winding 412 is wound N/2 times between the slot 411 between the second and third teeth 409 and 409 and the slot 411 between the tenth and first teeth 409 and 409 to form a second U phase small coil 572U.

Next, the winding 412 is pulled from the slot 411 between the tenth and first teeth 409 and 409, and hooked around the riser 415 of the seventh segment 414 adjacent to the sixth segment 414. Further, the winding 412 is hooked around the riser 415 of the second segment 414 having the same electric potential as the seventh segment 414. Accordingly, the connecting wire 425 configured to short-circuit the seventh segment 414 and the second segment 414 is formed.

Next, a first V phase small coil 571V to a second Y phase small coil 572Y and the connecting wire 425 are sequentially formed by the winding 412. Here, since a winding sequence of the first V phase small coil 571V to the second Y phase small coil 572Y is similar to the fifth embodiment, description thereof will be omitted. However, the number of turns of the winding 412 wound between the slots 411 and 411 is N/2 times, which is half of that of the fifth embodiment.

Meanwhile, the winding 412 having the other winding start end 431 hooked around the riser 415 of the first segment 414 having the same electric potential as the sixth segment 414 sequentially forms a first U phase small coil 671V to a second Y phase small coil 672Y and the connecting wire 425 while being routed to be point-symmetrical about the rotary shaft 405 to a winding sequence when the winding start end 431 is hooked around the riser 415 of the sixth segment 414.

That is, when hooked around the riser 415 of the first segment 414, the winding 412 is subsequently hooked around the riser 415 of the sixth segment 414. Then, the connecting wire 425 configured to short-circuit the first segment 414 and the sixth segment 414 is formed.

Next, the winding 412 is pulled into the slot 411 between the second and third teeth 409 and 409, and the winding 412 is wound N/2 times between the slot 411 between the second and third teeth 409 and 409 and the slot 411 between the tenth and first teeth 409 and 409 to form a second U phase small coil 672U. The winding 412 forming the second U phase small coil 672U is pulled from the slot 411 between the tenth and first teeth 409 and 409, routed in the rotational direction, and then pulled into the slot 411 between the seventh and eighth teeth 409 and 409. Then, the winding 412 is wound N/2 times between the slot 411 between the seventh and eighth teeth 409 and 409 and the slot 411 between the fifth and sixth teeth 409 and 409 to form a first U phase small coil 671U.

Next, the winding 412 is pulled from the slot 411 between the fifth and sixth teeth 409 and 409, and hooked around the riser 415 of the second segment 414 adjacent to the first segment 414. Further, the winding 412 is hooked around the riser 415 of the seventh segment 414 having the same electric potential as the second segment 414. Accordingly, the connecting wire 425 configured to short-circuit the second segment 414 and the seventh segment 414 is formed.

Next, a first V phase small coil 671V to the second Y phase small coil 672Y and the connecting wire 425 are sequentially formed by the winding 412. Here, since the winding sequence of the first V phase small coil 671V to the second Y phase small coil 672Y is point-symmetrical about the rotary shaft 405 to the winding sequence when the winding start end 431 is hooked around the riser 415 of the sixth segment 414, description thereof will be omitted.

In this way, each of the phase coils 471U to 472Y is constituted by the two small coils 571U to 672Y wound N/2 times, forming the coils 471U to 472Y wound N times as a whole.

(Effects)

Accordingly, according to the seventh embodiment, like the sixth embodiment, since the winding 412 can be wound using the so-called double flyer method, the same effects as in the sixth embodiment can be exhibited. In addition, the small coils 571U to 572Y and the small coils 671U to 672Y having the same phase can be connected in series while employing the double flyer method. That is, for example, the first U phase small coil 571U and the second U phase small coil 572U are connected in series.

For this reason, the same current is stably supplied to the coils having the same phase through the first phase coils 471U to 471Y and the second phase coils 472U to 472Y.

Here, for example, like the sixth embodiment, when the first phase coils 471U to 471Y and the second phase coils 472U to 472Y are formed by different windings 412, a conductive wire length may be varied and different current may also be supplied to the coils having the same phase due to a slight winding error or the like. However, in the seventh embodiment, since the small coils 571U to 572Y and the small coils 671U to 672Y having the same phase are connected in series, the same current is stably supplied to the coils having the same phase. Accordingly, the magnetic field formed at the phase coils 471U to 472Y can be stabilized, and the electric motor 401 having good magnetic balance can be provided. As a result, durability of the brush 421 can be improved.

Further, in the fifth to seventh embodiments, the case in which the two brush holders 419 are installed at the holder stay 418 and the two brushes 421 and 421 come in contact with the segment 414 has been described. However, the present invention is not limited thereto but the number of brushes 421 can be increased to four, which is the same number as that of the poles.

In addition, the present invention is not limited to the above-mentioned embodiments but various modifications may be made in the above-mentioned embodiments without departing from the scope of the present invention.

INDUSTRIAL APPLICABILITY

According to the above electric motor, as the first flat section is formed at the cylindrical section of the yoke, the electric motor can be reduced in size in comparison with the case in which the cylindrical section is formed in a cylindrical shape. In addition, as the permanent magnets are disposed at positions distant from the first flat section, the electric motor can be reduced in size regardless of the thickness of the permanent magnet.

REFERENCE SIGNS LIST 2, 102, 201, 401 electric motor
3, 103, 212, 405 rotary shaft
5, 105, 208, 218, 402 yoke
6, 106, 206, 403 armature
7, 107, 214, 224, 404 permanent magnet
8, 108, 261, 406 armature core
10, 110, 263, 413 commutator
12, 112, 409 tooth
15, 115, 268, 414 segment
53, 153 cylindrical section
53a, 153a inner circumferential surface
61 first flat section
130, 210, 421 brush
135 heat protection element
241 core main body
243, 412 winding
251, 252 tooth group
262, 407 armature coil (coil)
264 core plate
471U first U phase coil
472U second U phase coil
471V first V phase coil
472V second V phase coil
471W first W phase coil
472W second W phase coil
471X first X phase coil
472X second X phase coil
471Y first Y phase coil
472Y second Y phase coil
571U, 671U first U phase small coil
572U, 672U second U phase small coil
571V, 671V first V phase small coil
572V, 672V second V phase small coil
571W, 671W first W phase small coil
572W, 672W second W phase small coil
571X, 671X first X phase small coil
572X, 672X second X phase small coil
571Y, 671Y first Y phase small coil
572Y, 672Y second Y phase small coil
S1 first slot (first deformed slot)
S2 second slot (second deformed slot)
S3 third slot (third deformed slot)
S4 fourth slot (third deformed slot)
S5 fifth slot (third deformed slot)
S6 sixth slot (first deformed slot)
S7 seventh slot (second deformed slot)
S8 eighth slot (third deformed slot)
S9 ninth slot (third deformed slot)
S10 tenth slot (third deformed slot)
T1 first tooth (first deformed tooth)
T2 second tooth (second deformed tooth)
T3 third tooth (second deformed tooth)
T4 fourth tooth (second deformed tooth)
T5 fifth tooth (second deformed tooth)
T6 sixth tooth (first deformed tooth)
T7 seventh tooth (second deformed tooth)
T8 eighth tooth (second deformed tooth)
T9 ninth tooth (second deformed tooth)
T10 tenth tooth (second deformed tooth)

The invention claimed is:

1. An electric motor comprising:
a yoke having a cylindrical section about an axial direction;
two pairs of permanent magnets fixed to an inner circumferential surface of the cylindrical section and arranged such that magnetic N poles and S poles are alternately disposed in a circumferential direction;

an armature rotatably supported about the axial direction further inside in a radial direction than the permanent magnets;

brushes configured to supply electricity to the armature; and a brush holder formed to hold the brushes and having an outer shape circumferentially about the axial direction, the brush holder has a longitudinal direction and lateral direction along the radial direction, the lateral direction is orthogonal to the longitudinal direction, one length in the longitudinal direction of the outer shape is greater than the other lengths in the radial direction of the outer shape, wherein the cylindrical section has first flat sections and arc-shaped sections, each of the arc-shaped sections being configured to connect two of the first flat sections in the circumferential direction, the permanent magnets are disposed at positions corresponding to the arc-shaped sections, respectively, in the circumferential direction, a width of the opposite first flat sections in the radial direction is represented as L1 and a width of the opposite arc-shaped sections in the radial direction is represented as R1, the width L1 of the first flat sections and the width R1 of the arc-shaped sections are set to satisfy L1<R1, in the cross-sectional view of the axial direction, the opposite first flat sections are aligned along the lateral direction of the outer shape of the brush holder, each of the first flat sections of the cylindrical section is disposed between two of the permanent magnets in the circumferential direction, each of the arc-shaped sections of the cylindrical section has a portion that is disposed between two of the permanent magnets in the circumferential direction, and the portions of the arc-shaped sections and the first flat sections are alternately disposed in the circumferential direction.

2. The electric motor according to claim 1, wherein a brush holder-receiving section, which is configured to receive the brush holder, is integrally formed with the cylindrical section of the yoke at an opening section of the cylindrical section.

3. The electric motor according to claim 2, wherein the outer shape of the brush holder has substantially oval shape in the cross-sectional view, the brush holder-receiving section has a circumferential wall that has a substantially oval shape in the cross-sectional view so as to substantially correspond to the outer shape of the brush holder, the circumferential wall of the brush holder-receiving section has flat walls and arc-shaped walls, each of the arc-shaped walls being configured to connect two of the flat walls in the circumferential direction, and the flat walls of the brush holder-receiving section are formed to be flush with the first flat sections of the yoke.

4. The electric motor according to claim 3, further comprising two brushes configured to supply electricity to the armature, wherein the two brushes are disposed at mechanical angle at a 90° interval in a circumferential direction, a heat protection element configured to cut the supply of electricity to the armature upon overheating is disposed at an opposite side of the two brushes with a rotary shaft of the armature sandwiched therebetween, and a choke coil is disposed inside the flat walls of the brush holder-receiving section.

5. The electric motor according to claim 4, further comprising an armature core constituted by a plurality of core plates, which are stacked, each having a core main body fitted and fixed onto the rotary shaft and ten teeth protruding from the core main body outward in the radial direction, and on which a winding is wound between two of the teeth neighboring the circumferential direction, wherein the teeth comprise two tooth groups, each constituted by five deformed teeth neighboring the circumferential direction, the two tooth groups are disposed to be point-symmetrical to each other about the rotary shaft, the five deformed teeth are constituted by:

a first deformed tooth having a distal end formed to be tilted toward an opposite side of the winding direction of the winding with respect to a virtual standard tooth extending in the radial direction; and four second deformed teeth formed in the circumferential direction at the winding direction side of the first deformed tooth and having distal ends formed to be tilted in the winding direction with respect to the virtual standard tooth, a first deformed slot is formed between the second deformed teeth and the first deformed tooth of the other tooth group adjacent to the second deformed teeth at the winding direction side of the second deformed teeth, a second deformed slot is formed between the first deformed tooth and the second deformed teeth adjacent to the first deformed tooth one of the second deformed teeth closest to the first deformed tooth at the winding direction side of the first deformed tooth, and three third deformed slots are formed between the second deformed teeth neighboring each other in the circumferential direction, and the first deformed slot, the second deformed slot, and the third deformed slots are sequentially formed in the winding direction.

6. The electric motor according to claim 5, further comprising a commutator installed at the rotary shaft adjacent to the armature core, wherein the winding is wound at each of the teeth and having a 5-phase structure is formed in the circumferential direction through a distributed winding method to straddle the two neighboring teeth, in the circumferential direction in sequence of a U1 phase, a V1 phase, a W1 phase, an X1 phase, a Y1 phase, a U2 phase, a V2 phase, a W2 phase, an X2 phase and a Y2 phase, the commutator has a total of the ten segments disposed in the circumferential direction such that two segments having the same electric potential corresponding to each phase are disposed to oppose each other about the rotary shaft, and the segments having the same electric potential are constituted in four poles, ten slots and ten segments by short-circuiting the winding, the winding is connected to the two segments as a coil of the U1 phase, the coil of the U1 phase is wound between the first deformed slot and the third deformed slot disposed at a rear side in the winding direction of the first deformed slot, the winding is connected to the two segments as a coil of the V1 phase, the coil of the V1 phase is wound between the second deformed slot and the third deformed slot disposed at a rear side in the winding direction of the second deformed slot, the winding is connected to the two segments as a coil of the W1 phase, the coil of the W1 phase is wound in two third deformed slots disposed at both sides with a middle third deformed slot interposed therebetween in the three third deformed slots, the winding is connected to the two segments as a coil of the X1 phase, the coil of the X1 phase is wound between the first deformed slot of the other tooth group and the middle third deformed slot disposed at a rear side in the winding direction of the first deformed slot of the other tooth group, the winding is connected to the two segments as a coil of the Y1 phase, and then the coil of the Y1 phase is wound between the second deformed slot of the other tooth group and the last third deformed slot in the winding direction of the current tooth group, further, simultaneously with the formation of the coils of the U1 phase, the V1 phase, the W1 phase, the X1 phase and the Y1 phase, the winding is connected to the two segments as a coil of the U2 phase, the coil of the U2 phase is wound between the first deformed slot and the third deformed slot disposed at a rear side in the winding direction of the first deformed slot, the winding is connected to the two segments as a coil of the V2 phase, the coil of the V2 phase is wound between the second deformed slot and the third deformed slot disposed at a rear side in the winding direction of the second deformed slot, the winding is connected to the two segments as a coil of the W2 phase, the coil of the W2 phase is wound between the two third deformed slots disposed at both sides with the middle third deformed slot interposed therebetween in the three third deformed slots, the winding is connected to the two segments as a coil of the X2 phase, the coil of the X2 phase is wound between the first deformed slot of the other tooth group and the middle third deformed slot, and the winding is connected to the two segments as a coil of the Y2 phase, and then the coil of the Y2 phase is wound between the second deformed slot of the other tooth group and the last third deformed slot in the winding direction of the current tooth group, and a positional relationship between predetermined segments and predetermined teeth on which the coils of the winding are wound around is an opposite positional relationship about the rotary shaft.

* * * * *